(12) United States Patent
Sato et al.

(10) Patent No.: US 7,995,766 B2
(45) Date of Patent: Aug. 9, 2011

(54) GROUP SUBORDINATE TERMINAL, GROUP MANAGING TERMINAL, SERVER, KEY UPDATING SYSTEM, AND KEY UPDATING METHOD THEREFOR

(75) Inventors: Taichi Sato, Kyoto (JP); Kaoru Yokota, Hyogo (JP); Natsume Matsuzaki, Osaka (JP); Yuichi Futa, Osaka (JP); Tetsuya Inoue, Kyoto (JP); Masao Nonaka, Osaka (JP)

(73) Assignee: Panasonic Corporation, Osaka (JP)

( * ) Notice: Subject to any disclaimer, the term of this patent is extended or adjusted under 35 U.S.C. 154(b) by 582 days.

(21) Appl. No.: 12/147,126

(22) Filed: Jun. 26, 2008

(65) Prior Publication Data
US 2010/0014677 A1 Jan. 21, 2010

(30) Foreign Application Priority Data
Jun. 28, 2007 (JP) ................................. 2007-169929

(51) Int. Cl.
*H04L 9/08* (2006.01)
(52) U.S. Cl. ....................... 380/279; 713/163
(58) Field of Classification Search .......... 380/277–286; 713/163, 189
See application file for complete search history.

(56) References Cited

U.S. PATENT DOCUMENTS
2003/0126464 A1* 7/2003 McDaniel et al. ............ 713/201
2004/0096063 A1* 5/2004 Carroni et al. ................ 380/279
2007/0263983 A1* 11/2007 Ando et al. ..................... 386/95

FOREIGN PATENT DOCUMENTS
JP 2000-101566 4/2000
JP 2003-273857 9/2003
* cited by examiner

*Primary Examiner* — Gilberto Barron, Jr.
*Assistant Examiner* — Malcolm Cribbs
(74) *Attorney, Agent, or Firm* — Wenderoth, Lind & Ponack, L.L.P.

(57) ABSTRACT

Provided is a group subordinate terminal in a key updating system that includes a server and a group of terminals including: a group managing terminal; and group subordinate terminals including the group subordinate terminal, the group subordinate terminal comprising: a group withdrawal request processing unit which transmits a group withdrawal request to the group managing terminal in response to an instruction to update its apparatus-unique key, the group withdrawal request requesting for withdrawal of the group subordinate terminal from the group; an update apparatus-unique key requesting unit which requests for another apparatus-unique key by transmitting to the server a group withdrawal certificate indicating that the withdrawal of the group subordinate terminal from the group of terminals is completed through invalidation of its group key; and an update processing unit which updates the apparatus-unique key held in an apparatus-unique key holding unit to the another apparatus-unique key obtained from the server.

13 Claims, 8 Drawing Sheets

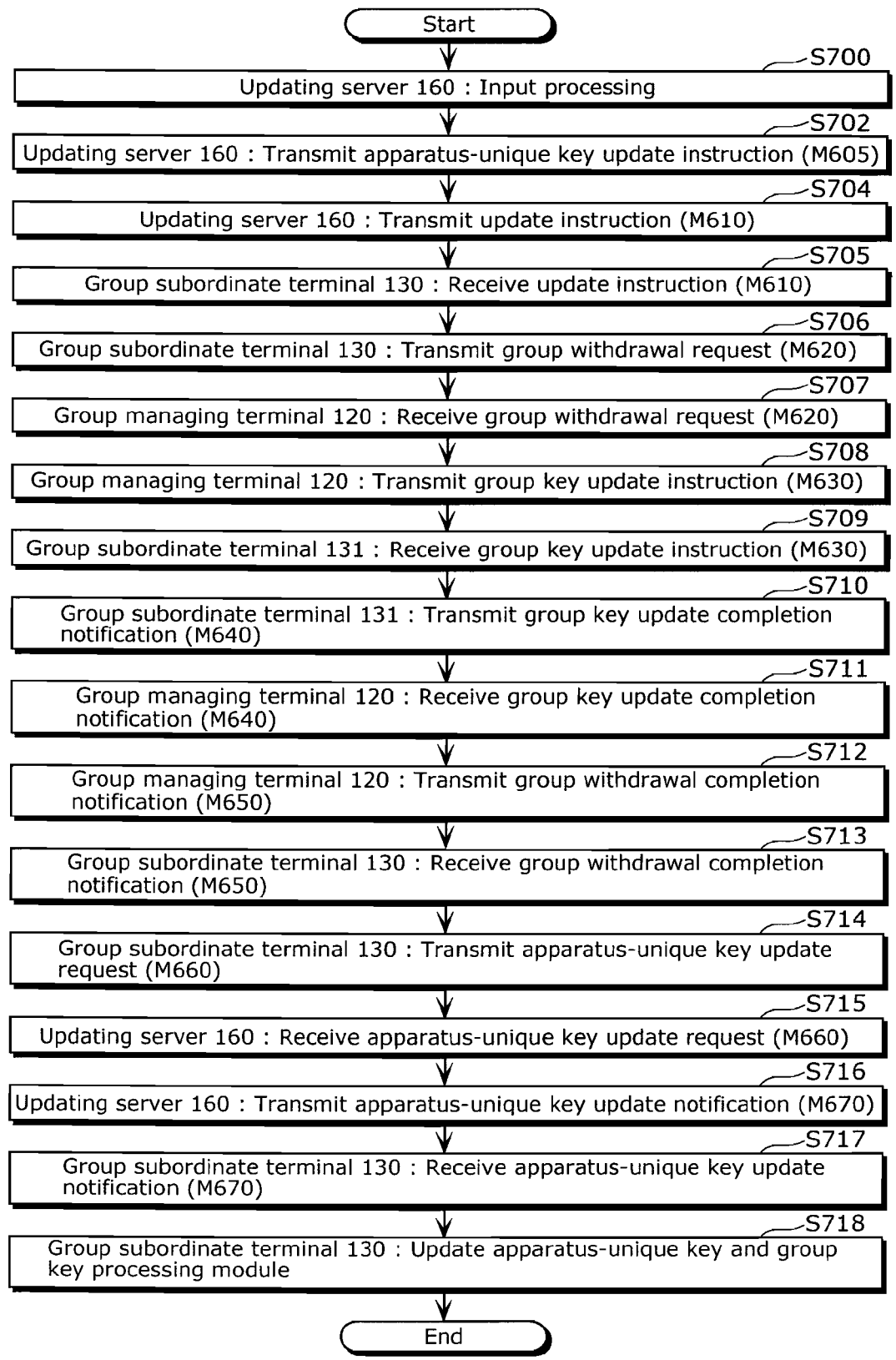

GROUP SUBORDINATE TERMINAL, GROUP MANAGING TERMINAL, SERVER, KEY UPDATING SYSTEM, AND KEY UPDATING METHOD THEREFOR

BACKGROUND OF THE INVENTION (1) Field of the Invention

The present invention relates to group subordinate terminals, group managing terminals, servers, key updating systems, and key updating methods therefor. More particularly, the present invention relates to a group subordinate terminal, a group managing terminal, a server, a key updating system, and a key updating method therefor for enabling an update of a group key shared by two or more terminals.

(2) Description of the Related Art

Digital content such as digitalized audio, video, and novels can be easily copied or distributed.

This holds true not only for the case where the content is legitimately copied or distributed by copyright holders of the content, but also true for the case where the content is copied or distributed by an unauthorized person with no copyright. Therefore, such unauthorized copying and distribution need to be prevented in order to protect the rights and benefits of the copyright holders. Especially, it is important in protection of copyrights to prevent the unauthorized copying and distribution of digital content performed based on copyrighted content that has been digitalized and legitimately distributed by the copyright holders.

There have been known copyright protection technologies for preventing unauthorized copying and distribution of content using ciphers and the like. To be more specific, a different key (apparatus-unique key) is embedded in advance in each apparatus to which content is distributed. Then, the content is distributed after being encrypted using the apparatus-unique key held by a legitimate content purchaser's apparatus. For example, an apparatus-unique key 1 is embedded in advance in an apparatus 1, an apparatus-unique key 2 in an apparatus 2, . . . , and an apparatus-unique key N in an apparatus N, and when a user 1 having the apparatus 1 purchases content X, the content X is distributed to the user 1 by first encrypting the content X using the apparatus-unique key 1 and then transmitting the encrypted content X to the apparatus 1. With such a distribution method, even when the user 2 having the apparatus 2 obtains the content X encrypted using the apparatus-unique key 1, the user 2 cannot decrypt the content X because the user 2 only has the apparatus-unique key 2. This way, the copyright of the content X is protected.

However, if an unauthorized analyzer is able to analyze the apparatus-unique key 1 of the apparatus 1, he becomes able to decrypt the content X that has been encrypted using the apparatus-unique key 1. This enables the unauthorized analyzer to copy and distribute the decrypted content X in plain text without authorization. Therefore, the apparatus-unique keys held by respective apparatuses need to be implemented in such a manner that they cannot be analyzed without authorization.

In addition, when the unauthorized analyzer tampers and modifies the decryption process, for which the apparatus-unique key 1 is used, in a way that the content in plain text can be written to a Hard Drive Disk (HDD) and the like, unauthorized copying and distribution are made possible using the written content. Therefore, the function of decryption processing performed by the apparatuses needs to be implemented in such a manner that the processing cannot be tampered without authorization.

As described above, the processing using the apparatus-unique keys needs to be implemented in such a manner that it cannot be analyzed or tampered without authorization. Tamper-resistant technologies are developed to address such need.

Incidentally, there are various methods for unauthorized analysis. Therefore, when manufacturing apparatuses, tamper resistance needs to be provided for protection against attacks using the various unauthorized analysis methods. However, in some cases, a new method for unauthorized analysis is found after the tamper-resistant apparatuses are manufactured and released on the market. Presently, there is no tamper-resistant technology available that can fully prevent unauthorized analysis and tampering, and thus further finding of new unauthorized analysis methods is expected. Thus, it is desirable that the tamper resistance can be updated when a new unauthorized analysis method is found, even after the apparatuses are released on the market.

When a new method for unauthorized analysis is found, what happens in most cases is that attackability of the newly found method is theoretically confirmed, and after some period of time, unauthorized analysis is put into practice using the found method. Therefore, an update of the tamper resistance is desirable at an early stage of the confirmation of the found unauthorized analysis method's attackability. Furthermore, even when the tamper resistance is found to be vulnerable based on the fact that the unauthorized analysis is actually performed, the update of the tamper resistance is desirable before the unauthorized analysis spreads to numerous apparatuses.

The ability to disable the tamper resistance favors unauthorized analyzers, and thus not updating the tamper resistance is desirable from their viewpoint. Further, the vulnerable apparatuses with unupdated tamper resistance are sometimes purchased at a high price by the unauthorized analyzers. Thus, not updating the tamper resistance sometimes yields some profits even for general users who are unlikely to perform unauthorized analysis, which could indicate that the users may be less motivated to update the tamper resistance.

In order to address such situations, there is a method proposed which encourages the update of the tamper resistance by not allowing apparatuses with tamper resistance that needs to be but has not been updated, to receive new content. More specifically, there is a method proposed which encourages apparatus users wishing to receive new content to update the apparatus-unique key at an early stage, by not encrypting content using the unupdated apparatus-unique key for distribution.

Incidentally, although each apparatus is given a different apparatus-unique key, it is sometimes problematic that the content held by each apparatus cannot be used by other apparatuses. Such a problematic case exists when, for example, there is more than one apparatus in a single household. To be more specific, the problem exists when there is more than one apparatus in a single household but content purchased through a particular one of the apparatuses cannot be used by other apparatuses in the same household.

In view of the foregoing, there is a mechanism proposed which sets a group of two or more apparatuses in a household, thereby enabling mutual use of content between the apparatuses in the group. To achieve this mechanism, a group key unique to the group is used in addition to the apparatus-unique keys. More specifically, the apparatuses in the same household are provided with the same group key in addition to their respective apparatus-unique keys. For example, when one wishes to use content of an apparatus A with another apparatus in the same household (apparatus B), the content encrypted using the apparatus-unique key of the apparatus A is once decrypted using the same apparatus-unique key, and then again encrypted using a group key to be transmitted to the apparatus B. Having received the re-encrypted content, the apparatus B decrypts it with the group key before use. Such a configuration enables the apparatus B to use the content purchased through the apparatus A. For example, Patent Reference 1, Japanese Unexamined Patent Application Publication No. 2000-101566, discloses a system that uses group keys.

The tamper resistance is necessary, as described above, also for group keys and the encryption and decryption processing for which group keys are used (that is, processing of encryption and decryption using group keys, hereinafter also referred to as group key processing). Further, not only is it desirable to update the tamper resistance when found to be vulnerable, but it is also desirable to encourage the apparatus users to update the group key too.

However, with the processing using the apparatus-unique keys, the content distributor has the control not to distribute content to terminal apparatuses having an unupdated apparatus-unique key, because it is the content distributor who distributes the content encrypted with an apparatus-unique key. However, the content encrypted with a group key is distributed by a group terminal apparatus that is already in the possession of the user. For this reason, it is impossible to control the content not to be distributed to the terminal apparatus having an unupdated group key.

In view of the foregoing, Patent Reference 2, Japanese Unexamined Patent Application Publication No. 2003-273857, discloses a method for distributing, when a group key is uncovered, a new group key to group terminal apparatuses excluding the group terminal having the uncovered group key. In Patent Reference 2, a terminal apparatus list of terminal apparatuses making up a group is held by the server on the updating service provider side. When one of the terminal apparatuses on the user side is found to be vulnerable, the server side obtains the terminal apparatus list including the vulnerable terminal apparatus, and transmits a new group key to each of the terminal apparatuses on the list except for the vulnerable one.

However, with the method disclosed in Patent Reference 2, the updating service provider side needs to have the list of terminal apparatuses making up the group. Thus, the use of such a method requires complex processing when the service provider or the server that manages and updates what is to be updated is different from the service provider or the server that manages the group.

Furthermore, in Patent Reference 2, the terminal apparatuses receiving the new group key are terminal apparatuses which belong to the same group as the vulnerable terminal apparatus and which are already in possession of the user. Consequently, it is expected that when these terminal apparatuses do not receive a new group key, the group key is not updated, resulting in the continued use of the old group key.

SUMMARY OF THE INVENTION

The present invention has been conceived in view of the above described circumstances, and an object thereof is to provide a group subordinate terminal, a group managing terminal, a server, a key updating system, and a key updating method therefor for enabling an update of a group key for terminal apparatuses making up a group, except for a terminal apparatus having an apparatus-unique key to be updated, without the need for the updating service provider to hold the list of the terminal apparatuses making up the group including the terminal apparatus having the apparatus-unique key to be updated.

In order to solve the above described problems, the group subordinate terminal according to a first aspect of the present invention is a group subordinate terminal in a key updating system that includes a server and a group of terminals including: a group managing terminal; and group subordinate terminals including the group subordinate terminal, the group subordinate terminal comprising: a group withdrawal request processing unit configured to transmit a group withdrawal request to the group managing terminal in response to an instruction to update its apparatus-unique key, the group withdrawal request requesting for withdrawal of the group subordinate terminal from the group; an update apparatus-unique key requesting unit configured to request for another apparatus-unique key by transmitting to the server a group withdrawal certificate indicating that the withdrawal of the group subordinate terminal from the group of terminals is completed through invalidation of its group key; and an update processing unit configured to update the apparatus-unique key held in an apparatus-unique key holding unit to the another apparatus-unique key obtained from the server.

According to this aspect, it is possible to provide a group subordinate terminal, a group managing terminal, a server, a key updating system, and a key updating method therefor for enabling an update of a group key for terminal apparatuses which make up a group, except for a terminal apparatus having an apparatus-unique key to be updated, without the need for the updating service provider to hold the list of the terminal apparatuses making up the group including the terminal apparatus having the apparatus-unique key to be updated.

Further Information about Technical Background to this Application

The disclosure of Japanese Patent Application No. 2007-169929 filed on Jun. 28, 2007 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 8 is a flow chart showing the processing performed in the group key updating system 100 for updating an apparatus-unique key.

DETAILED DESCRIPTION OF THE INVENTION

Figure 1:
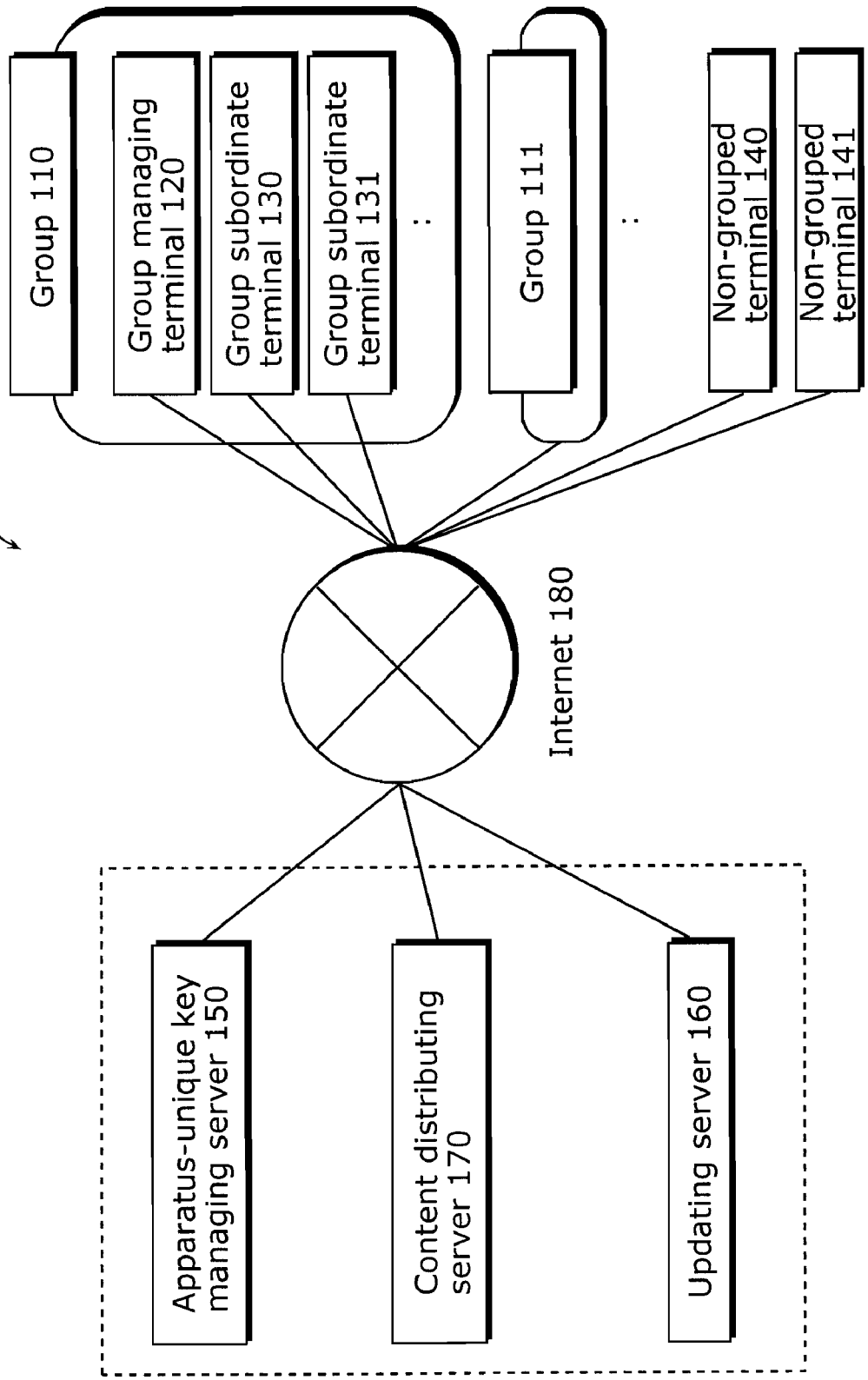
FIG. 1 is a diagram showing the configuration of a group key updating system 100 according to a first embodiment of the present invention.

A group subordinate terminal according to a first aspect of the present invention is a group subordinate terminal in a key updating system that includes a server and a group of terminals including: a group managing terminal; and group subordinate terminals including the group subordinate terminal, the group subordinate terminal comprising: an apparatus-unique key holding unit configured to hold an apparatus-unique key that is a key corresponding to the group subordinate terminal only; a group key holding unit configured to hold a group key that is also held by the group managing terminal and the rest of the group subordinate terminals; an encryption and decryption processing unit configured to encrypt and decrypt data using either the apparatus-unique key or the group key; a group withdrawal request processing unit configured to transmit a group withdrawal request to the group managing terminal in response to an instruction to update the apparatus-unique key, the group withdrawal request requesting for withdrawal of the group subordinate terminal from the group; an update apparatus-unique key requesting unit configured to request for another apparatus-unique key by: receiving a group withdrawal certificate from the group managing terminal; and then transmitting the received group withdrawal certificate to the server, the group withdrawal certificate indicating that the withdrawal of the group subordinate terminal from the group of terminals is completed through invalidation of the group key; and an update processing unit configured to obtain the another apparatus-unique key from the server, and to rewrite the apparatus-unique key held by the apparatus-unique key holding unit to the obtained another apparatus-unique key.

A group subordinate terminal according to a second aspect of the present invention is the group subordinate terminal, wherein the update processing unit includes a group key update processing unit configured to request the group managing terminal for another group key that is valid, and to update the group key held by the group key holding unit to the another group key that is valid, the another group key being obtained from the group managing terminal.

A group subordinate terminal according to a third aspect of the present invention is the group subordinate terminal further comprising an update instruction receiving unit configured to instruct the group withdrawal request processing unit to update the apparatus-unique key in response to an instruction from the server to update the apparatus-unique key.

With the configurations according to the above described aspects of the present invention, the group subordinate terminal cannot obtain a new apparatus-unique key from the server unless the group withdrawal certificate, indicating the withdrawal from the group, is obtained. As a result, it is possible to encourage the user of the group subordinate terminal to not only update the apparatus-unique key, but also invalidate (or update) the vulnerable group key through the withdrawal from the group. Consequently, it is possible to provide a group subordinate terminal, a group managing terminal, a server, a key updating system, and a key updating method therefor for enabling the update of a group key of terminal apparatuses making up a group, except for the terminal apparatus having an apparatus-unique key to be updated, without the need for the updating service provider to have the list of the terminal apparatuses of the group including the terminal apparatus having the apparatus-unique key to be updated.

A group managing terminal according to a sixth aspect of the present invention is a group managing terminal in a key updating system that includes a server and a group of terminals including: the group managing terminal; and at least a first group subordinate terminal and a second group subordinate terminal, the group subordinate terminal comprising: a group key holding unit configured to hold a group key that is also held by the first group subordinate terminal and the second group subordinate terminal; a group withdrawal request receiving unit configured to receive a group withdrawal request from the first group subordinate terminal, the group withdrawal request requesting for withdrawal of the first group subordinate terminal from the group; a group withdrawal processing unit configured to generate a new group key and transmit the generated new group key to the second group subordinate terminal, in response to the group withdrawal request; and a group withdrawal certificate transmitting unit configured to receive a group key update completion notification from the second group subordinate terminal, and to transmit a group withdrawal certificate to the first group subordinate terminal, the group key update completion notification indicating that update of the group key held by the second group subordinate terminal to the new group key is completed, and the group withdrawal certificate indicating that the withdrawal of the first group subordinate terminal from the group of terminals is completed through invalidation of the group key held by the first group subordinate terminal.

A server according to a seventh aspect of the present invention is a server in a key updating system that includes the server and a group of terminals including: a group managing terminal; and group subordinate terminals, the server comprising: an update key generating unit configured to generate an apparatus-unique key corresponding to one of the group subordinate terminals; and an apparatus-unique key update processing unit configured to: receive a group withdrawal certificate from the group subordinate terminal; verify the received group withdrawal certificate; and then transmit the generated apparatus-unique key to the group subordinate terminal, the group withdrawal certificate indicating that withdrawal of the group subordinate terminal from the group of terminals is completed through invalidation of the group key held by the group subordinate terminal.

It should be noted that the above described aspects of the present invention can be embodied not only as an apparatus having the above characteristic units, but also as: an integrated circuit having the characteristic units of the apparatus, a method having steps performed by the characteristic units of the apparatus; a program causing a computer to execute such steps; and the like. Obviously, such a program can be distributed by recording media such as a Compact Disc-Read Only Memory (CD-ROM) or by transmission media such as the Internet.

For example, in order to solve the above described problems, a computer program product for updating a key of a group subordinate terminal according to the present invention may be a computer program product for updating a key of a group subordinate terminal in a key updating system that includes a server and a group of terminals including: a group managing terminal; and group subordinate terminals including the group subordinate terminal, the computer program product, when loaded into a computer, allowing the computer to execute: transmitting a group withdrawal request to the group managing terminal in response to an instruction to update an apparatus-unique key that is a key corresponding to the group subordinate terminal only, the group withdrawal request requesting for withdrawal of the group subordinate terminal from the group of terminals; requesting for another apparatus-unique key by: receiving a group withdrawal certificate from the group managing terminal; and then transmitting the received group withdrawal certificate to the server, the group withdrawal certificate indicating that the withdrawal of the group subordinate terminal from the group of terminals is completed through invalidation of the group key; and obtaining the another apparatus-unique key from the server, and rewriting the apparatus-unique key to the obtained another apparatus-unique key.

Further, for example, in order to solve the above described problems, a computer program product for updating a key of a group managing terminal according to the present invention may be a computer program product for updating a key of a group managing terminal in a key updating system that includes a server and a group of terminals including: the group managing terminal; and at least a first group subordinate terminal and a second group subordinate terminal, the computer program product, when loaded into a computer, allowing the computer to execute: receiving a group withdrawal request from the first group subordinate terminal, the group withdrawal request requesting for withdrawal of the first group subordinate terminal from the group of terminals; generating a new group key to be held by the group managing terminal, the first group subordinate terminal and the second group subordinate terminal, and transmitting the generated new group key to the second group subordinate terminal, in response to the group withdrawal request; and receiving a group key update completion notification from the second group subordinate terminal, and transmitting a group withdrawal certificate to the first group subordinate terminal, the group key update completion notification indicating that update of the group key held by the second group subordinate terminal to the new group key is completed, and the group withdrawal certificate indicating that the withdrawal of the first group subordinate terminal from the group of terminals is completed through invalidation of the group key held by the first group subordinate terminal.

Furthermore, for example, in order to solve the above described problems, a computer program product for updating a key of a server in a key updating system that includes the server and a group of terminals including a group managing terminal and group subordinate terminals, the computer program product, when loaded into a computer, allowing the computer to execute: generating an apparatus-unique key corresponding to one of the group subordinate terminals; and receiving a group withdrawal certificate from the group subordinate terminal; verifying the received group withdrawal certificate, and then transmitting the generated apparatus-unique key to the group subordinate terminal, the group withdrawal certificate indicating that withdrawal of the group subordinate terminal from the group of terminals is completed through invalidation of the group key held by the group subordinate terminal.

With reference to the drawings, the following shall describe embodiments of the present invention.

First Embodiment

The following shall describe a group key updating system 100 according to a first embodiment of the present invention.

FIG. 1 is a diagram showing the configuration of the group key updating system 100 according to the first embodiment of the present invention.

The group key updating system 100 includes: groups such as a group 110 and a group 111; user's terminals such as a non-grouped terminal 140 and a non-grouped terminal 141; and servers on an updating service provider side, including an apparatus-unique key managing server 150, an updating server 160, and a content distributing server 170. The servers and the terminals of the group key updating system 100 are mutually connected via an Internet 180.

Next, the servers and the terminals of the group key updating system 100 shall be described.

<Terminals>

(1) Each Terminal

The terminals such as a group managing terminal 120, a group subordinate terminal 130, a group subordinate terminal 131, the non-grouped terminal 140, and the non-grouped terminal 141 are terminals which use content received from the content distributing server 170.

It should be noted that examples of the group managing terminal 120 in the present embodiment include a personal computer (PC), a home server, a Set Top Box (STB), and the like. The terminals such as the group subordinate terminal 130, the group subordinate terminal 131, the non-grouped terminal 140, and the non-grouped terminal 141 are PCs, mobile terminals, TVs, and the like.

It should be noted that the following description is based on an assumption that content in the present embodiment refers to digital content such as digitalized audio, video, and novels. Furthermore, in the present embodiment, using content refers to using content through reproducing, copying, and printing the content, and the like.

Further, each of the above mentioned terminals holds an apparatus-unique key corresponding thereto (in other words, each terminal holds a different apparatus-unique key).

(2) Groups Such as the Groups 110 and 111

Each of the groups such as the group 110 and the group 111 is a group of one or more terminals sharing content distributed by the content distributing server 170. Each group includes a group managing terminal that manages the terminals belonging to the group, and one or more group subordinate terminals. For example, the group 110 includes the group managing terminal 120, the group subordinate terminal 130, the group subordinate terminal 131, and so on, as shown in FIG. 1.

The terminals belonging to the same group hold the same group key. Each terminal has a processing unit which performs encryption and decryption using the group key (hereinafter referred to as group key processing unit).

Also, each terminal has a group key processing module holding unit which holds a software module for implementing the encryption and decryption using the group key (group key processing). The group key processing unit performs encryption and decryption using the group key by executing the software module held by the group key processing module holding unit. Here, the group key processing module is updatable. When the group key processing module is found to be vulnerable, it is updated to an update-version group key processing module transmitted from the after-mentioned updating server 160.

It should be noted that the terminals such as the non-grouped terminal 140 and the non-grouped terminal 141 are terminals belonging to none of the groups. For example, a terminal that does not hold any group key is a non-grouped terminal, and a terminal that has belonged to a group withdraws therefrom, it becomes a non-grouped terminal. Further, the non-grouped terminal becomes a group terminal by obtaining a group key of any group.

<Server>

(3) Content Distributing Server 170

The content distributing server 170 is a PC, for example, and is a server which distributes content to each terminal (the group managing terminal 120 and the group subordinate terminal 130, for example) via the Internet 180.

(4) Apparatus-Unique Key Managing Server 150

The apparatus-unique key managing server 150 is typically a PC, and holds the apparatus-unique keys of the above described terminals. For example, the terminals to which content is distributed are assigned with unique identification information such as an IP (Internet Protocol) address in advance, and the apparatus-unique key managing server 150 stores in a database pairs of the unique identification information and the apparatus-unique key.

Further, when distributing content to each terminal, the content distributing server 170 transmits the identification information, unique to the terminal, to the apparatus-unique key managing server 150. Based on the received unique identification information, the apparatus-unique key managing server 150 identifies an appropriate apparatus-unique key from the database, and transmits it to the content distributing server 170.

The content distributing server 170 obtains the apparatus-unique key by receiving it from the apparatus-unique key managing server 150 and encrypts content with the obtained apparatus-unique key before distributing the content to the terminal. Having received the encrypted content, the terminal decrypts it with the apparatus-unique key held by the terminal. It should be noted that Data Encryption Standard (DES) is used for the encryption of content, for example. The DES shall not be described in detail since it is well known.

(5) Updating Server 160

The updating server 160 is typically a PC, and is a server for distributing an apparatus-unique key and an update-version group key processing module to the terminal specified by an operator, for example.

When a group key processing module held by a terminal is found to be vulnerable, the updating server 160 distributes an update-version group key processing module to this terminal.

Now, the following shall describe messages including various instructions and notifications transmitted and received between the terminals or between the terminals and the servers.

Each message includes the following three elements.

1. Identifier indicating what kind of instruction and notification the message is.
2. Identifier indicating the terminal which is the source of the message (the source terminal) in the communication network; it is used for identifying the source terminal of the message in the communication network. To be more specific, it is an IP address or the like of the source terminal of the message.
3. Parameter indicating details of the instruction and notification.

Accordingly, each instruction and notification is assigned with a different identifier that enables the receiver of the instruction and notification to identify the source terminal of the instruction and the notification and details of the instruction and the notification.

Next, the following shall describe the configurations of the group subordinate terminal 130, the group managing terminal 120, and the updating server 160, centering on their functions related to the processing for updating the apparatus-unique keys and the group keys.

<Group Subordinate Terminal 130>

Figure 2:
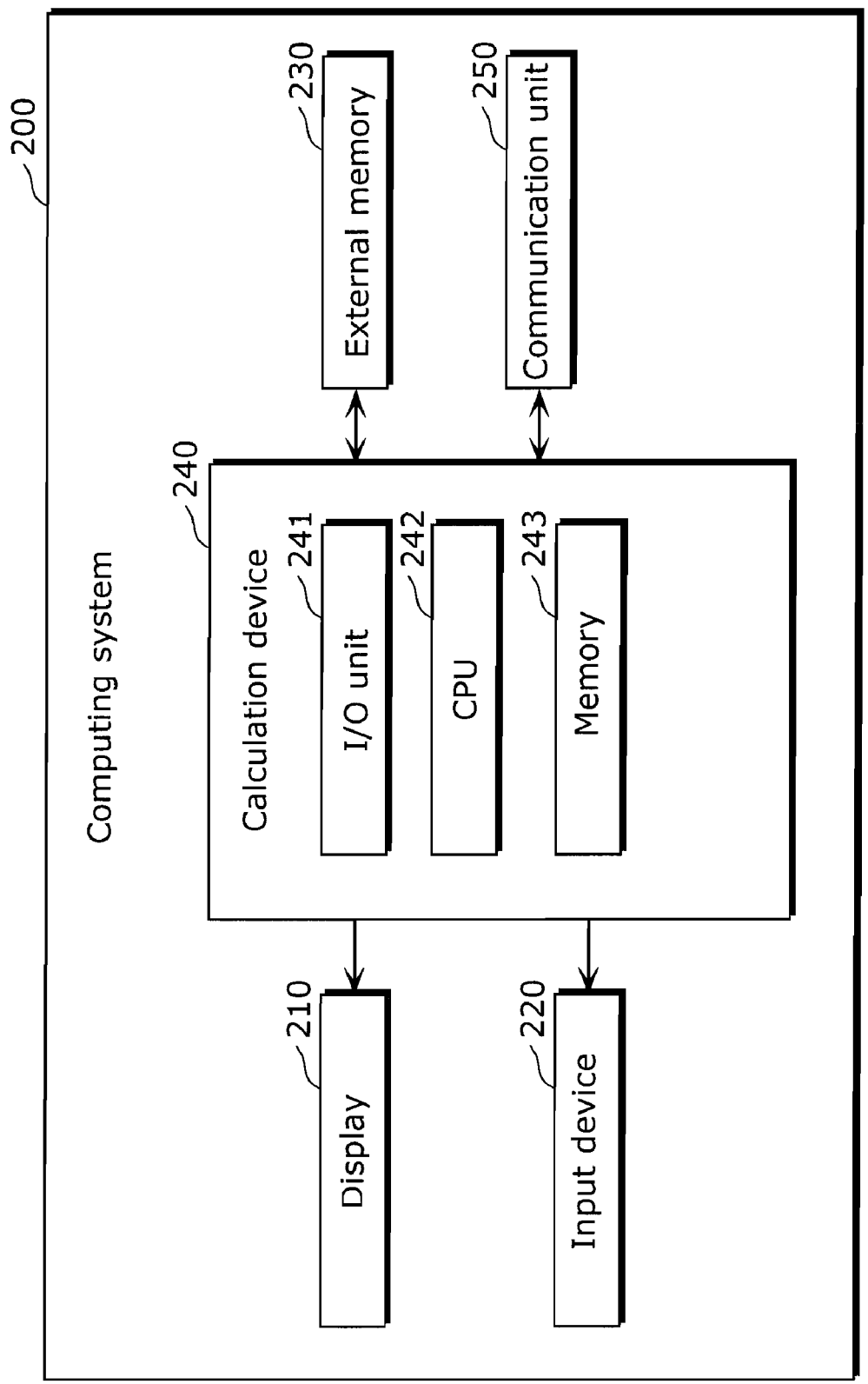
FIG. 2 is a diagram showing an example of the configuration of a computing system 200 of a group subordinate terminal 130.

FIG. 2 is a diagram showing an example of the configuration of a computing system 200 of the group subordinate terminal 130. The computing system 200 of FIG. 2 is an example of the hardware configuration of the group subordinate terminal 130 according to the present invention.

The computing system 200 includes: a calculation device 240; a display 210 which displays content and the like; an input device 220 which accepts user's instructions from a keyboard or the like and processes them; an external memory 230 for storing programs and so on; and a communication unit 250 which communicates with external sources.

The calculation device 240 performs calculation and includes: an Input and Output (I/O) unit 241 which manages inputs and outputs; a Central Processing Unit (CPU) 242 which performs computation; and a memory 243. Specifically, the calculation device 240 is a PC, a home appliance, an IC (Integrated Circuit) card, or the like. Preferably, the calculation device 240 is a one-chip Large-Scale Integration (LSI) secured against analysis by external sources.

The processing of the group subordinate terminal 130 of the present invention is stored in the memory 243 and the external memory 230, and is performed by the CPU 242.

Figure 3:
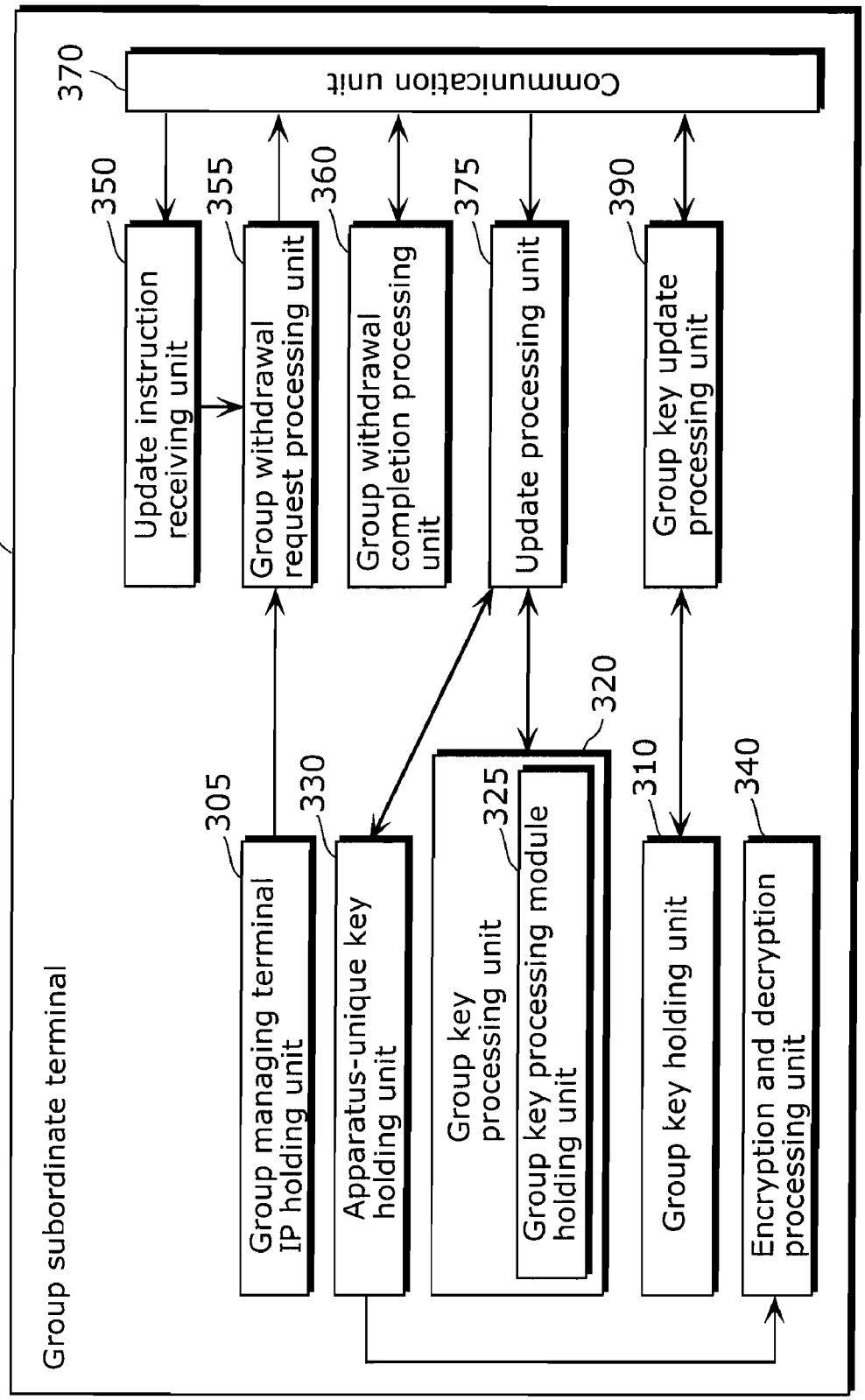
FIG. 3 is a block diagram showing an example of the configuration of the group subordinate terminal 130.

FIG. 3 is a block diagram showing an example of the configuration of the group subordinate terminal 130. The group subordinate terminal 130 includes: a group managing terminal IP holding unit 305; a group key holding unit 310; a group key processing unit 320; a group key processing module holding unit 325; an apparatus-unique key holding unit 330; an encryption and decryption processing unit 340; an update instruction receiving unit 350; a group withdrawal request processing unit 355; a group withdrawal completion processing unit 360; a communication unit 370; an update processing unit 375; and a group key update processing unit 390. The following shall describe each of these units.

The group managing terminal IP holding unit 305 holds an IP address of the group managing terminal 120 of the group 110 to which the group subordinate terminal 130 belongs.

The group key holding unit 310 holds a group key of the group 110 to which the group subordinate terminal 130 belongs.

The group key processing module holding unit 325 holds a group key processing module which performs encryption and decryption using the group key held by the group key holding unit 310.

The group key processing unit 320 includes the group key processing module holding unit 325, and performs encryption and decryption of content using the group key held by the group key holding unit 310. More specifically, the group key processing unit 320 performs encryption and decryption of content through the group key processing module held by the group key processing module holding unit 325, using the group key held by the group key holding unit 310.

It should be noted that the group key processing unit 320 may not include the group key processing module holding unit 325. The form of the group key processing unit 320 is not limited as long as it performs the encryption and decryption of content using the group key processing module of the group key processing module holding unit 325.

The apparatus-unique key holding unit 330 holds the apparatus-unique key of the group subordinate terminal 130.

The encryption and decryption processing unit 340 performs encryption and decryption of data using the apparatus-unique key held by the apparatus-unique key holding unit 330.

The update instruction receiving unit 350 receives an update instruction (M610) from the updating server 160 via the communication unit 370. Having received the update instruction (M610), the update instruction receiving unit 350 instructs the group withdrawal request processing unit 355 to start processing for withdrawing from the group 110.

In response to the instruction from the update instruction receiving unit 350 to start the processing for withdrawing from the group 110, the group withdrawal request processing unit 355 transmits a group withdrawal request for withdrawing from the group 110 (M620) to the group managing terminal 120 via the communication unit 370. More specifically, the group withdrawal request processing unit 355 transmits, via the communication unit 370, the group withdrawal request (M620) to withdraw its terminal, that is, the group subordinate terminal 130, from the group 110, to the IP address, held by the group managing terminal IP holding unit 305, of the group managing terminal 120.

The group withdrawal completion processing unit 360 obtains a group withdrawal certificate by receiving a group withdrawal completion notification (M650) from the group managing terminal 120 via the communication unit 370.

After receiving the group withdrawal completion notification (M650), the group withdrawal completion processing unit 360 transmits to the updating server 160 via the communication unit 370 an apparatus-unique key update request (M660) which contains the group withdrawal certificate. To be more specific, the group withdrawal completion processing unit 360 analyzes the group withdrawal completion notification (M650) received, and obtains a group withdrawal certificate which is a parameter. Thereafter, the group withdrawal completion processing unit 360 transmits the apparatus-unique key update request (M660) to the updating server 160. The parameter of this message is assumed to be the group withdrawal certificate obtained. It is to be noted that the details of the group withdrawal certificate shall be described later.

The update processing unit 375 obtains a new apparatus-unique key and a new group key processing module by receiving an apparatus-unique key update notification (M670) transmitted from the updating server 160 via the communication unit 370.

With the new apparatus-unique key and the new group key processing module obtained, the update processing unit 375 updates the apparatus-unique key held by the apparatus-unique key holding unit 330 and the group key processing module held by the group key processing module holding unit 325, respectively. Specifically, the update processing unit 375 overwrites the apparatus-unique key held by the apparatus-unique key holding unit 330 with the value of the new apparatus-unique key received as the parameter of the apparatus-unique key update notification (M670). Furthermore, the update processing unit 375 overwrites the group key processing module held by the group key processing module holding unit 325 with the update-version group key processing module received as the parameter of the apparatus-unique key update notification (M670).

The group key update processing unit 390 obtains a new group key by receiving a group key update instruction (M630) from the group managing terminal 120 via the communication unit 370.

The group key update processing unit 390 updates the group key held by the group key holding unit 310 to the new group key obtained. More specifically, the group key held by the group key holding unit 310 is overwritten with the value of the new key received as the parameter of the message.

After updating the group key, the group key update processing unit 390 transmits to the group managing terminal 120 via the communication unit 370 a group key update completion notification (M640) indicating that the update of the group key is completed.

Further, in the case where the group subordinate terminal 130 is to join the group 110 again after the apparatus-unique key is updated, the group key update processing unit 390 transmits a group join request to the group managing terminal 120 via the communication unit 370, the group join request indicating that the group subordinate terminal 130 wishes to join the group 110 again.

The communication unit 370 receives messages from the terminals, the servers, and so on, and analyzes the identifiers of the received messages. Based on the analyzed identifiers, the communication unit 370 transmits each of the received messages to one of the following units: the update instruction receiving unit 350, the group withdrawal completion processing unit 360, the update processing unit 375, and the group key update processing unit 390.

Further, the communication unit 370 transmits the messages received from the group withdrawal request processing unit 355 and the group key update processing unit 390, to the servers, the group managing terminal 120, and so on.

The information held by each holding unit above is stored in the memory 243 and the external memory 230 in the above described computing system 200. Further, the processing of each processing unit above is implemented by being stored in the memory 243 and the external memory 230 and being performed by the CPU 242. Furthermore, the reception processing performed by the communication unit 370 and the transmission processing performed by each processing unit are implemented via the communication unit 250. In addition, preferably, the memory 243 is a nonvolatile memory, and all the above described details of what is stored are stored in the memory 243.

As described above, once the group subordinate terminal 130 receives the update instruction (M610) from the updating server 160, it cannot obtain a new apparatus-unique key from the updating server 160 unless it requests the group managing terminal 120 to withdraw the group subordinate terminal 130 from the group 110 and obtains the group withdrawal completion notification (M650) indicating that the group subordinate terminal 130 has withdrawn from the group 110. As a result, it is possible to encourage the user of the group subordinate terminal 130 to not only update the apparatus-unique key, but also invalidate (and update) the vulnerable group key and module performing the group key processing.

<Group Managing Terminal 120>

Figure 4:
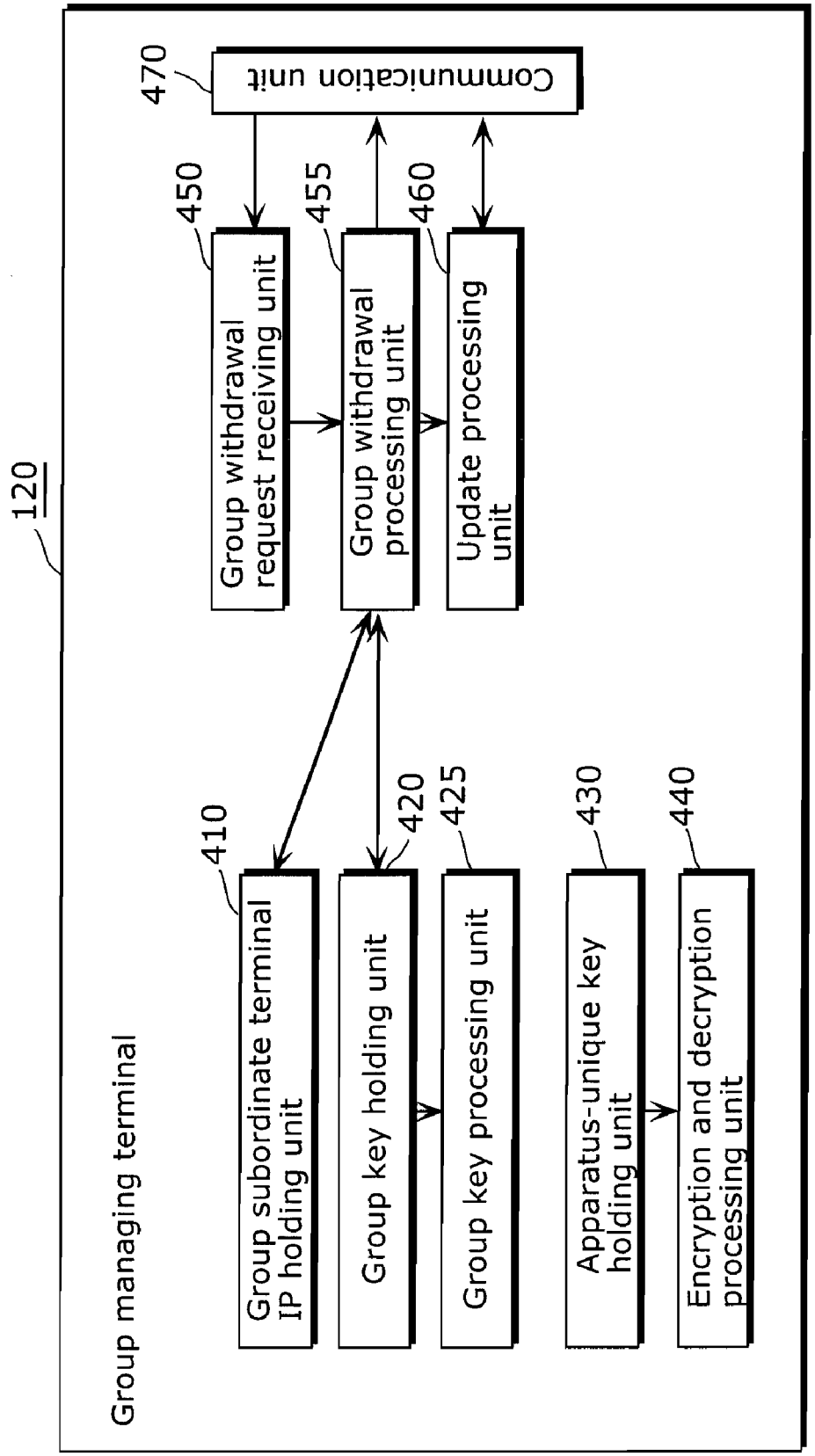
FIG. 4 is a block diagram showing an example of the configuration of a group managing terminal 120.

FIG. 4 is a block diagram showing an example of the configuration of the group managing terminal 120. The group managing terminal 120 includes: a group subordinate terminal IP holding unit 410; a group key holding unit 420; a group key processing unit 425; an apparatus-unique key holding unit 430; an encryption and decryption processing unit 440; a group withdrawal request receiving unit 450; a group withdrawal processing unit 455; an update processing unit 460; and a communication unit 470. The following shall describe each of these constituent elements in detail.

The group subordinate terminal IP holding unit 410 holds an IP address list of IP addresses of the group subordinate terminals belonging to the group 110 to which the group managing terminal 120 belongs (the group subordinate terminals 130 and 131, for example).

The group key holding unit 420 holds a group key of the group 110 to which the group managing terminal 120 belongs.

The group key processing unit 425 performs encryption and decryption of data using the group key held by the group key holding unit 420.

The apparatus-unique key holding unit 430 holds the apparatus-unique key of the group managing terminal 120.

The encryption and decryption processing unit 440 performs encryption and decryption of data using the apparatus-unique key held by the apparatus-unique key holding unit 430.

The group withdrawal request receiving unit 450 receives the group withdrawal request (M620) from the group subordinate terminal 130 via the communication unit 470. Having received the group withdrawal request (M620), the group withdrawal request receiving unit 450 instructs the group withdrawal processing unit 455 to start the processing for withdrawing the group subordinate terminal 130 from the group 110.

In response to the instruction from the group withdrawal request receiving unit 450, the group withdrawal processing unit 455 starts the processing for withdrawing the group subordinate terminal 130 from the group 110. To be more specific, the group withdrawal processing unit 455 first deletes, from the IP address list held by the group subordinate terminal IP holding unit 410, the IP address of the terminal which is the source of the group withdrawal request (M620) received by the group withdrawal request receiving unit 450 (the group subordinate terminal 130 is the source terminal in this case). Next, the group withdrawal processing unit 455 generates a new group key with a random value, and updates the group key held by the group key holding unit 420 to the newly generated one. Next, the group withdrawal processing unit 455 transmits, via the communication unit 470, the group key update instruction (M630) to each group subordinate terminal whose IP address is listed on the IP address list held by the group subordinate terminal IP holding unit 410 (the group subordinate terminal 131 and so on in this case). Here, the parameter of the message is assumed to be the above mentioned new group key.

The update processing unit 460 receives, via the communication unit 470, the group key update completion notification (M640) from each group subordinate terminal whose IP address is listed on the IP address list held by the group subordinate terminal IP holding unit 410 (the group subordinate terminal 131 and so on in this case). Then, the update processing unit 460 transmits the group withdrawal completion notification (M650) containing a group withdraw certificate, to the source terminal of the group withdrawal request (M620) received by the group withdrawal request receiving unit 450 (the group subordinate terminal 130 in this case). To be more specific, after receiving the group key update completion notification (M640), the update processing unit 460 transmits the group withdrawal completion notification (M650) to the group subordinate terminal 130 which has transmitted the message of the group withdrawal request (M620). The parameter of the group withdrawal completion notification (M650) contains the group withdrawal certificate generated by the update processing unit 460.

The following shall describe the group withdrawal certificate.

The group withdrawal certificate includes the following three fields.

Field A: The IP address of the source terminal of the group withdrawal request (M620).

Field B: The IP address of the group managing terminal 120.

Field C: A value obtained by calculating hash values of the field A and the field B and encrypting the calculated values using the apparatus-unique key of the group managing terminal 120.

Here, the function and procedure for converting a character string of documents and numbers arranged in sequence into data having a certain length is called hash function, and a value obtained through the function is called "hash value". The representative examples are the hash functions called SHA-1 and MD5 both of which are one-way functions, meaning that source data, which is pre-conversion data, cannot be extrapolated from the converted data.

Further, the update processing unit 460 receives from the group subordinate terminal 130 the group join request transmitted when the group subordinate terminal 130 is to join the group 110 again after updating the apparatus-unique key. Having received the group join request, the update processing unit 460 transmits the updated group key to the group subordinate terminal 130.

The communication unit 470 receives from the terminals, the servers and so on, messages indicating instructions and notifications, and analyzes the identifiers of the received messages. Based on the analyzed identifiers, the communication unit 470 transmits each of the received messages to either the group withdrawal request receiving unit 450 or the update processing unit 460.

Furthermore, the communication unit 470 transmits the messages from the group withdrawal processing unit 455 and the update processing unit 460, to the servers, the group managing terminal 120, and so on.

It should be noted that each holding unit and processing unit above is executed in the above described computing system 200. The correspondence between each unit of the corrupting system 200 and each unit in FIG. 4 is the same as the correspondence with each unit of the group subordinate terminal 130, and thus the description thereof shall be omitted.

As described above, having received the group withdrawal request (M620) from the group subordinate terminal 130, the group managing terminal 120 updates the group keys of the group subordinate terminals such as the group subordinate terminal 131, excluding the group subordinate terminal 130 that has transmitted the group withdrawal request (M620). The group managing terminal 120 updates the group keys of the group subordinate terminals, such as the group subordinate terminal 131, excluding the group subordinate terminal 130 that has transmitted the group withdrawal request (M620), and transmits to the group subordinate terminal 130 the group withdrawal completion notification containing the group withdrawal certificate certifying that the group subordinate terminal 130 has withdrawn from the group 110. In other words, when the group key is to be updated, it is possible to encourage the update of the group key and the apparatus-unique key of the group subordinate terminal 130 simply through communication and coordination within the group 110 without the communication with and coordination by the updating server 160.

<Updating Server 160>

Figure 5:
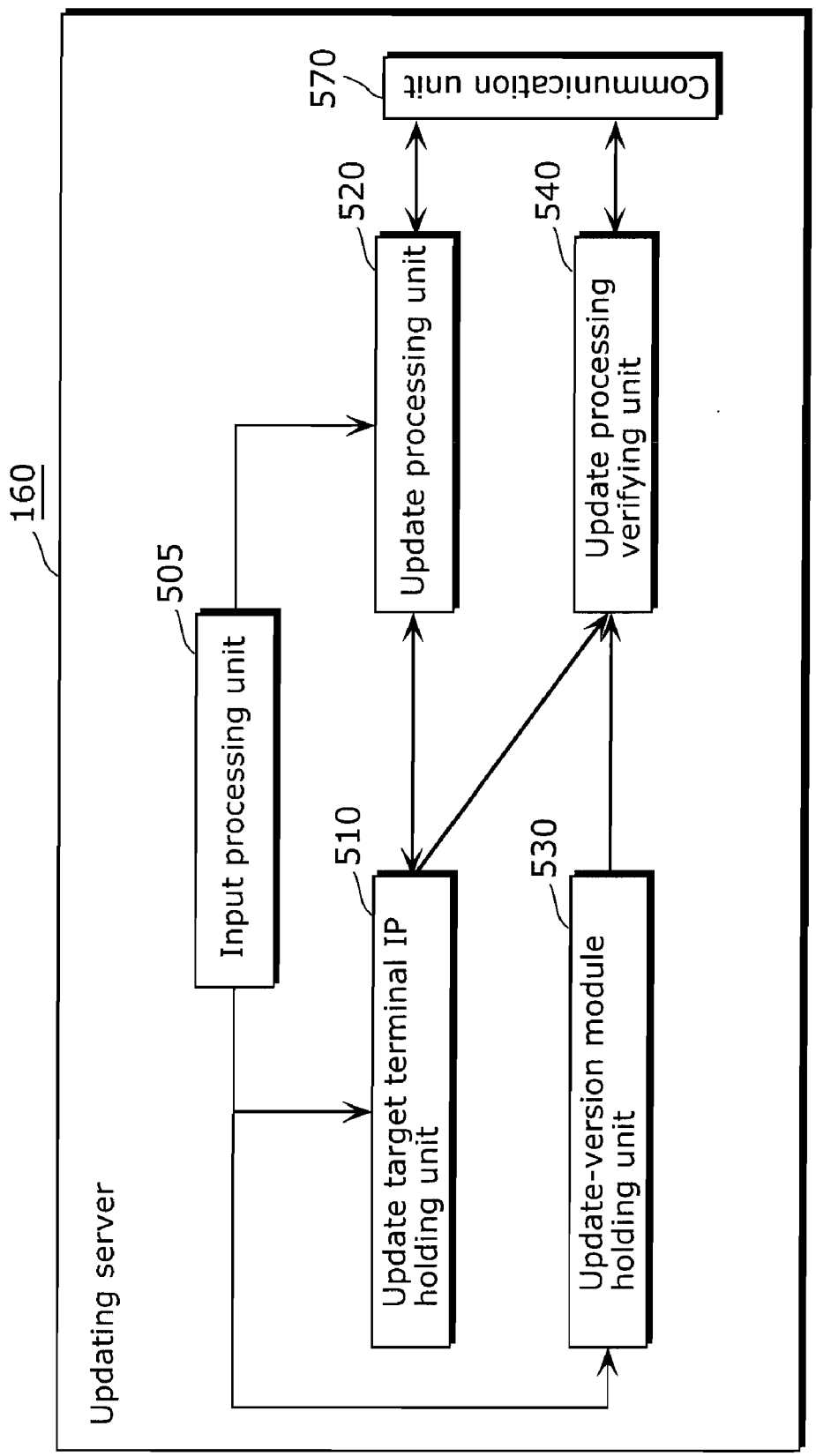
FIG. 5 is a block diagram showing an example of the configuration of an updating server 160.

FIG. 5 is a block diagram showing an example of the configuration of the updating server 160. The updating server 160 includes: an update target terminal IP holding unit 510; an update processing unit 520; an update-version module holding unit 530; an update processing verifying unit 540; an input processing unit 505; and a communication unit 570. The following shall describe each of these constituent elements in detail.

The update target terminal IP holding unit 510 holds IP addresses of candidates for update target terminals, that are terminals targeted for the update.

The update-version module holding unit 530 holds an update-version group key processing module which is an update version of the group key processing module to be transmitted to an update target terminal which is, for example, the group subordinate terminal 130.

The update processing unit 520 generates at random a new apparatus-unique key to be set in the update target terminal IP holding unit 510, based on an instruction from the input processing unit 505. The update processing unit 520 transmits an apparatus-unique key update instruction (M605) to the apparatus-unique key managing server 150. The parameter of this message is the IP address held by the update target terminal IP holding unit 510 and the value of the above mentioned new apparatus-unique key generated at random.

The update processing unit 520 selects an update target terminal, which needs to be updated, from among the candidates for update target terminals whose IP addresses are held by the update target terminal IP holding unit 510, and transmits the update instruction (M610) to the selected update target terminal.

The update processing verifying unit 540 performs its processing upon receiving the apparatus-unique key update request (M660) from the update target terminal which is the group subordinate terminal 130, for example. More specifically, the update processing verifying unit 540 verifies the group withdrawal certificate obtained as the parameter included in the apparatus-unique key update request (M660) which has been received from the update target terminal. Having verified the group withdrawal certificate, the update processing verifying unit 540 transmits the apparatus-unique key update notification (M670) to the update target terminal which has transmitted the apparatus-unique key update request (M660). Here, the update processing verifying unit 540 obtains the update-version group key processing module from the update-version module holding unit 530 and the new apparatus-unique key from the apparatus-unique key managing server 150, and transmits them, in the form that they are included in the apparatus-unique key update notification (M670), to the source terminal of the group withdrawal request (M620).

Furthermore, the parameter of the apparatus-unique key update notification (M670) includes the following two items.

1. The update-version group key processing module held by the update-version module holding unit 530.

2. The new apparatus-unique key of the update target terminal. Here, the new apparatus-unique key of the update target terminal is the apparatus-unique key, obtained from the apparatus-unique key managing server 150, of the apparatus having the IP address of the source terminal of the apparatus-unique key update request (M660).

The following shall describe the verification of the group withdrawal certificate.

Figure 6:
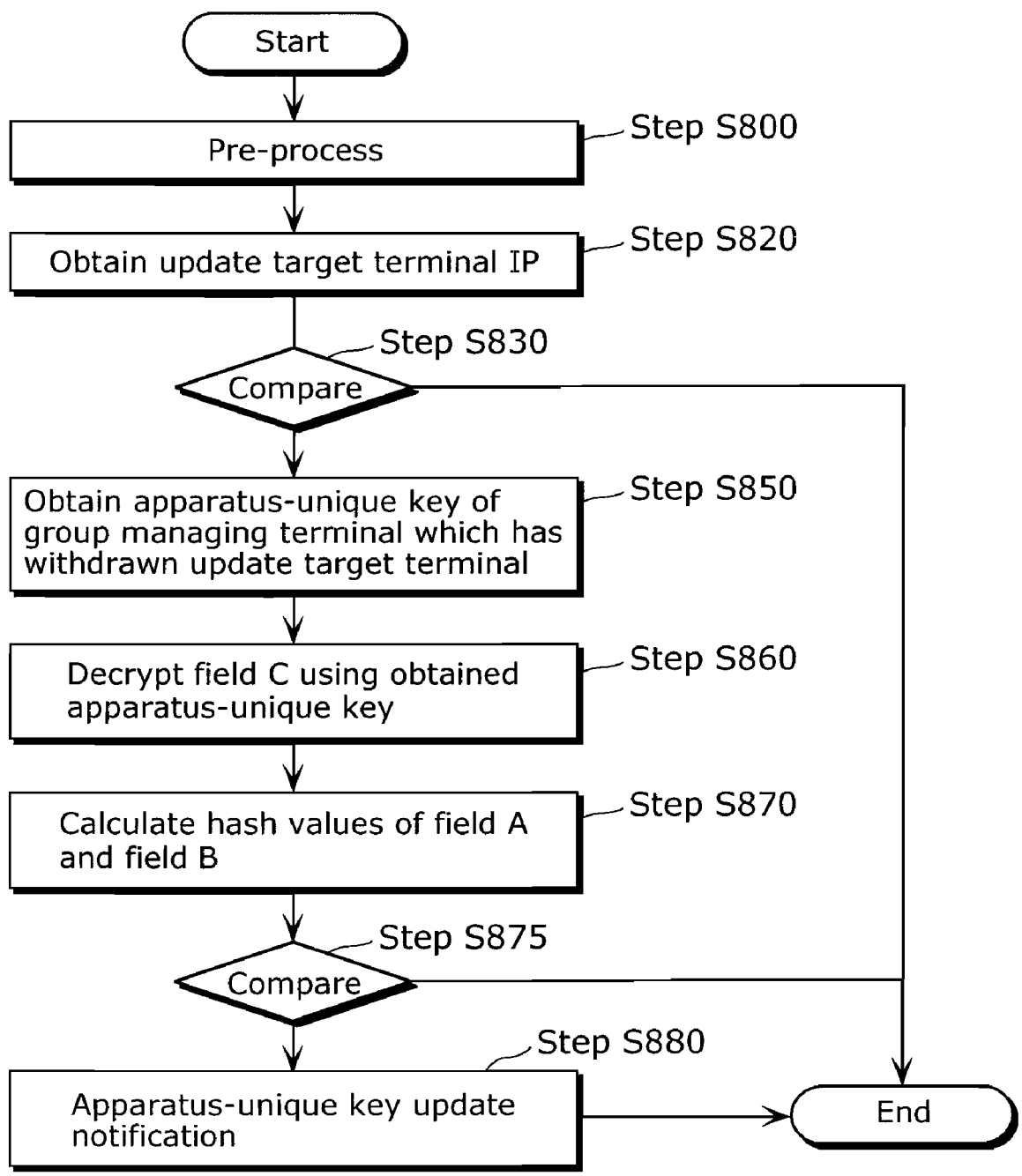
FIG. 6 is a flow chart showing the processing performed by an update processing verifying unit 540.

FIG. 6 is a flow chart showing the processing performed by the update processing verifying unit 540.

FIG. 6 shows the flow of the processing performed by the update processing verifying unit 540 from the verification of the group withdrawal certificate up to the transmission of the apparatus-unique key update notification (M670), the apparatus-unique key update notification (M670) being transmitted when the verification has been successful.

First, in Step S800, the update processing verifying unit 540 analyzes the parameter of the apparatus-unique key update request (M660) received from the update target terminal, which is, for example, the group subordinate terminal 130, and obtains the following fields A to C.

Field A: The IP address of the source terminal of the group withdrawal request (M620).

Field B: The IP address of the group managing terminal 120.

Field C: A value obtained by calculating hash values of the field A and the field B and encrypting the calculated values using the apparatus-unique key of the group managing terminal 120.

Next, in Step S820, the update processing verifying unit 540 obtains the IP address of the update target terminal held by the update target terminal IP holding unit 510.

Next, in Step S830, the update processing verifying unit 540 compares the IP address obtained in Step S820 and the IP address of the field A, and proceeds to Step S850 when the compared IP addresses are the same; otherwise, it ends the processing. With this, it is possible to judge whether or not the update target terminal making the apparatus-unique key update request (M660) is a terminal authorized to be updated.

Then, in Step S850, the update processing verifying unit 540 obtains from the apparatus-unique key managing server 150 the apparatus-unique key of the terminal having the IP address of the field B. That is to say, the update processing verifying unit 540 obtains the apparatus-unique key of the group managing terminal 120 which has withdrawn the group subordinate terminal 130.

Next, in Step S860, the update processing verifying unit 540 decrypts the value of the field C using the apparatus-unique key obtained in Step S850.

Next, in Step S870, the update processing verifying unit 540 calculates the hash values of the fields A and B.

Next, in Step S875, the update processing verifying unit 540 compares the value obtained by the decryption in Step S860 and the hash values calculated in Step S870, and proceeds to Step S880 when the compared values are the equal; otherwise, it ends the processing. With this, it is possible to judge whether or not the update target terminal which has made the apparatus-unique key update request (M660) is a terminal authorized to be updated, since when the update target terminal which has made the apparatus-unique key update request (M660) is a terminal authorized to be updated, the compared values match each other.

Next, in Step S880, the update processing verifying unit 540 transmits the apparatus-unique key update notification (M670) to the terminal having the IP address of the field A, that is, the IP address of the source terminal of the group withdrawal request (M620).

Here, the parameter included in the apparatus-unique key update notification (M670) is the update-version group key processing module and the new apparatus-unique key of the terminal having the IP address of the field A. It is to be noted that the update processing verifying unit 540 obtains the update-version group key processing module from the update-version module holding unit 530 and the new apparatus-unique key from the apparatus-unique key managing server 150, and transmits them, in the form that they are contained in the apparatus-unique key update notification (M670), to the source terminal of the group withdrawal request (M620).

As described above, the update processing verifying unit 540 verifies the group withdrawal certificate obtained from the source terminal of the group withdrawal request (M620), and when the verification is successful, transmits the apparatus-unique key update notification (M670) to the source terminal of the group withdrawal request (M620).

The input processing unit 505 inputs the received IP address of the update target terminal into the update target terminal IP holding unit 510 and the received update-version group key processing module into the update-version module holding unit 530. The input processing unit 505 instructs the update processing unit 520 to generate a new apparatus-unique key of the update target terminal.

The communication unit 570 receives from the terminals, the servers and so on, messages indicating instructions and notifications, and analyzes the identifiers of the received messages. Based on the analyzed identifiers, the communication unit 570 transmits each of the received messages to either the update processing unit 520 or the update processing verifying unit 540.

It should be noted that each holding unit and processing unit above is executed in the above described computing system 200. The correspondence between each unit of the computing system 200 and each unit in FIG. 5 is the same as the correspondence with each unit of the group subordinate terminal 130, and thus the description thereof shall be omitted. Furthermore, the input processing performed by the input processing unit 505 is implemented by the input device 220.

As described above, the updating server 160 is capable of encouraging the update target terminal, targeted for the update of the apparatus-unique key, to update not only the apparatus-unique key, but also the group key of the group 110 to which the update target terminal belongs, simply through the transmission of the update instruction (M610) to the update target terminal, without the communication with and coordination by a terminal such as the group managing terminal 120 which is other than the update target terminal.

Next, the following shall describe the processing for updating the apparatus-unique key, performed in the group key updating system according to the present invention.

<Outline of Update Processing>

Figure 7:
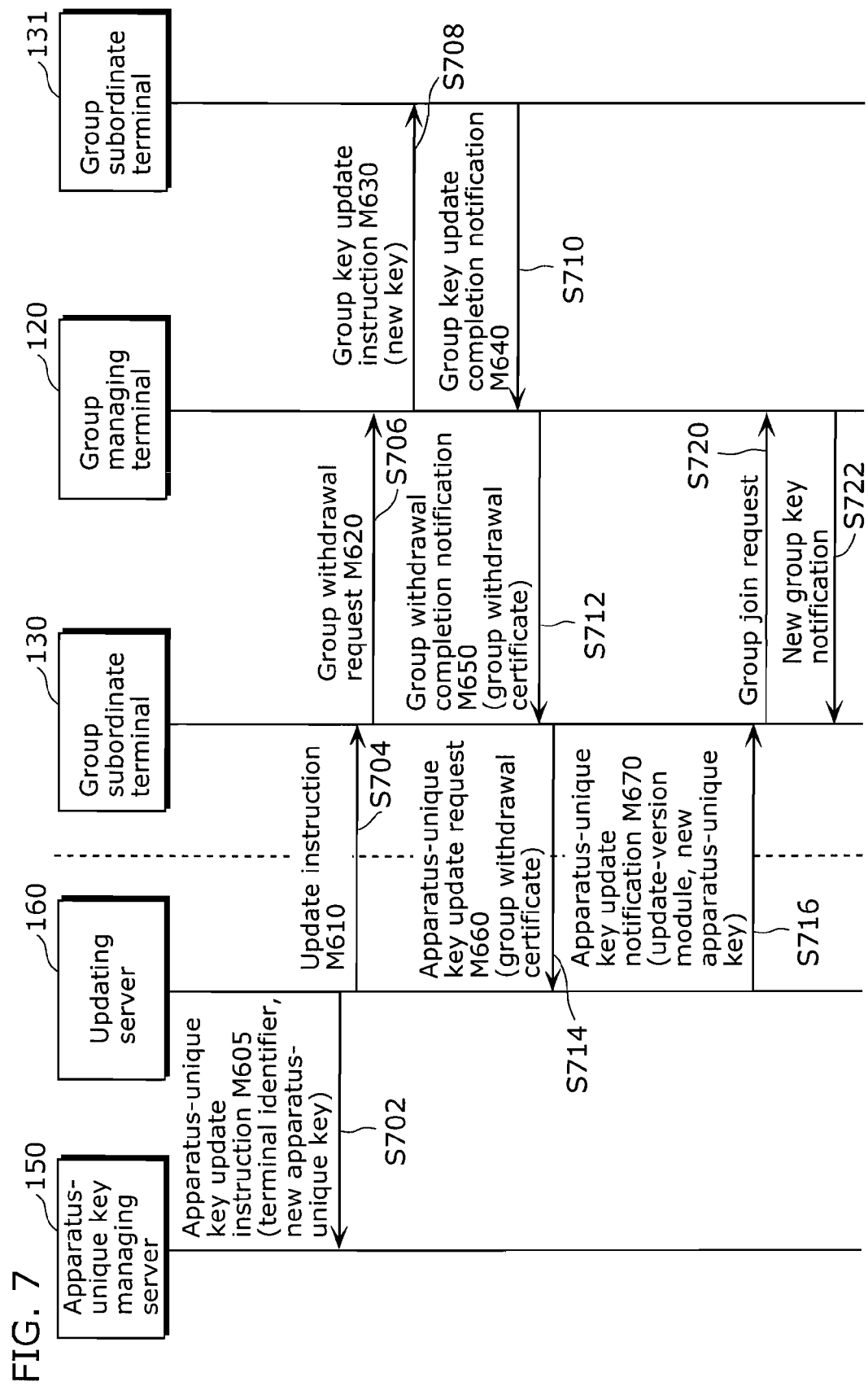
FIG. 7 is a sequence diagram showing the processing performed in the group key updating system 100 for updating an apparatus-unique key.

FIG. 7 is a sequence diagram showing the processing performed in the group key updating system 100 for updating the apparatus-unique key. FIG. 7 shows messages exchanged when the group subordinate terminal 130 updates its apparatus-unique key and group key processing module after the group subordinate terminal 130 is found to be vulnerable.

At first, the updating server 160 transmits to the apparatus-unique key managing server 150 the apparatus-unique key update instruction (M605) to instruct the apparatus-unique key managing server 150 to update the apparatus-unique key of the group subordinate terminal 130 which is the update target terminal, the apparatus-unique key update instruction (M605) containing a value of a new apparatus-unique key. Here, the parameter included in the apparatus-unique key update instruction (M605) contains: an identifier that identifies the terminal targeted for the update; and a value of the new apparatus-unique key to be updated to. It should be noted that parentheses shown below the messages in FIG. 7 each indicate a parameter included in the corresponding message. The apparatus-unique key managing server 150 receives the apparatus-unique key update instruction (M605), and updates the apparatus-unique key of the group subordinate terminal 130 to the received apparatus-unique key of the group subordinate terminal 130.

Further, the updating server 160 transmits the update instruction (M610) to the update target terminal that needs to be updated (S704).

Here, the update instruction (M610) is a message transmitted by the updating server 160 to a group subordinate terminal having a vulnerable group key processing module (the group subordinate terminal 130 in this case), and is a message instructing this group subordinate terminal to update the apparatus-unique key and the group key processing module. It should be noted that the update instruction (M610) includes no parameter.

Next, when the group subordinate terminal 130 receives the update instruction (M610) from the updating server 160, it transmits the group withdrawal request (M620) to the group managing terminal 120 (S706).

Here, the group withdrawal request (M620) is a message transmitted by the group subordinate terminal 130 to the group managing terminal 120, and is a message requesting that the group subordinate terminal 130 withdraw from the group 110. The group withdrawal request (M620) includes no parameter.

Then, having received the group withdrawal request (M620) from the group subordinate terminal 130, the group managing terminal 120 transmits the group key update instruction (M630) to the group subordinate terminals such as the group subordinate terminal 131, except for the group subordinate terminal 130 (S708).

Here, the group key update instruction (M630) is a message transmitted by the group managing terminal 120 instructing the group subordinate terminals such as the group subordinate terminal 131, except for the group subordinate terminal 130, to update the group key. The parameter of the group key update instruction (M630) is a value of a new group key to be used for the update.

The group subordinate terminals such as the group subordinate terminal 131 obtain the new group key by receiving the group key update instruction (M630) from the group managing terminal 120. The group subordinate terminals such as the group subordinate terminal 131 update the group key to the new group key obtained.

Next, having updated the group key, each of the group subordinate terminals such as the group subordinate terminal 131 transmits the group key update completion notification (M640) to the group managing terminal 120 (S710).

Here, the group key update completion notification (M640) is a message transmitted by the group subordinate terminals such as the group subordinate terminal 131, and is a message notifying the group managing terminal 120 that the update of the group key is completed. It should be noted that the group key update completion notification (M640) includes no parameter.

Next, having received the group key update completion notification (M640) from each of the group subordinate terminals such as the group subordinate terminal 131, the group managing terminal 120 transmits the group withdrawal completion notification (M650) containing the group withdrawal certificate to the group subordinate terminal 130 which has transmitted the message of the group withdrawal request (M620) (S712).

Here, the group withdrawal completion notification (M650) is a message transmitted by the group managing terminal 120, and is a message notifying the terminal which has transmitted the group withdrawal request (M620) that the withdrawal from the group is completed. The parameter included in the group withdrawal completion notification (M650) is the group withdrawal certificate certifying the withdrawal.

Then, having received the group withdrawal completion notification (M650) from the group managing terminal 120, the group subordinate terminal 130 transmits to the updating server 160 the apparatus-unique key update request (M660) containing the group withdrawal certificate (S714).

Here, the apparatus-unique key update request (M660) is a message transmitted by the group subordinate terminal 130 to the updating server 160, and is a message requesting the updating server 160 to transmit an update-version group key processing module to the group subordinate terminal 130. It should be noted that the parameter included in the apparatus-unique key update request (M660) is the group withdrawal certificate.

Next, the updating server 160 receives the apparatus-unique key update request (M660) from the group subordinate terminal 130, and verifies the group withdrawal certificate received. After the verification of the group withdrawal certificate received, the updating server 160 transmits the apparatus-unique key update notification (M670) to the group subordinate terminal 130 which is the update target terminal (S716).

Here, the apparatus-unique key update notification (M670) is a message transmitted to the group subordinate terminal 130 which is vulnerable, and is a message containing the update-version group key processing module and the new apparatus-unique key. The parameter included in the apparatus-unique key update notification (M670) is the update-version group key processing module and the new apparatus-unique key.

Next, the group subordinate terminal 130 obtains the new apparatus-unique key and the new group key processing module by receiving the apparatus-unique key update notification (M670) transmitted from the updating server 160. The group subordinate terminal 130 updates its apparatus-unique key and group key processing module to the obtained new apparatus-unique key and new group key processing module, respectively. Then, the group subordinate terminal 130 transmits to the group managing terminal 120 the group join request indicating that the group subordinate terminal 130 wishes to join the group 110 again (S720).

Next, the group managing terminal 120 receives the group join request from the group subordinate terminal 130. The group managing terminal 120 transmits to the group subordinate terminal 130 the updated new group key shared with the group subordinate terminals such as the group subordinate terminal 131 (S722).

In this manner, the group key updating system according to the present invention safely enables the update of the group key of the group to which the vulnerable terminal belongs, as well as the update of the apparatus-unique key of the vulnerable terminal.

As described above, it is possible, without the need for the updating service provider to have the list of the terminal apparatuses making up the group including the terminal apparatus to be updated, not only to provide a group subordinate terminal, a group managing terminal, a server, a key updating system, and a key updating method therefor for enabling the update of the group key of the terminal apparatuses making up the group, except for the terminal apparatus having an apparatus-unique key to be updated, but also to encourage the update of the apparatus-unique key and the module of the terminal that is vulnerable in terms of the group key processing, the module performing the group key processing.

<Details of Update Processing>

FIG. 8 is a flow chart showing the processing performed in the group key updating system 100 for updating the apparatus-unique key. FIG. 8 shows a flow of the processing performed for updating the apparatus-unique key and the group key processing module holding unit 325 of the group subordinate terminal 130 when the group subordinate terminal 130 is found to be vulnerable. It is to be noted that the steps which are the same as that in FIG. 7 are assigned with the same reference numerals.

In the initial condition, the group subordinate terminal IP holding unit 410 of the group managing terminal 120 holds the IP addresses of the group subordinate terminals 130, 131 and so on. Further, the group managing terminal IP holding units 305 of the group subordinate terminal 130 and of the group subordinate terminal 131 hold the IP address of the group managing terminal 120. Furthermore, the apparatus-unique key managing server 150 holds the apparatus-unique keys of the terminals such as the group managing terminal 120, the group subordinate terminal 130, and the group subordinate terminal 131, in association with the IP addresses of the respective terminals.

An operator on the updating service provider side inputs, via the input processing unit 505 of the updating server 160, the IP address and the update version of the group key processing module which are of the vulnerable group subordinate terminal 130. The input processing unit 505 of the updating server 160 stores the IP address and the update-version group key processing module which are of the vulnerable group subordinate terminal 130, both inputted by the operator, in the update target terminal IP holding unit 510 and in the update-version module holding unit 530, respectively, and starts the processing of the update processing unit 520 (S700).

Next, the update processing unit 520 of the updating server 160 obtains the IP address of the group subordinate terminal 130 held by the update target terminal IP holding unit 510, and generates a new apparatus-unique key for the group subordinate terminal 130. Next, the update processing unit 520 of the updating server 160 transmits to the apparatus-unique key managing server 150 the apparatus-unique key update instruction (M605) having the IP address of the group subordinate terminal 130 and the new apparatus-unique key generated (S702) as a parameter, and subsequently transmits the update instruction (M610) to the IP address of the group subordinate terminal 130 (S704).

Next, the communication unit 370 of the group subordinate terminal 130, which is the terminal to be updated, receives the update instruction (M610) from the updating server 160 (S705), and based on the identifier of the received message, identifies the update instruction (M610) as a message instructing the group subordinate terminal 130 to update the apparatus-unique key, and transmits the update instruction (M610) to the update instruction receiving unit 350.

Having received the update instruction (M610), the update instruction receiving unit 350 instructs the group withdrawal request processing unit 355 to start the processing for withdrawing from the group 110.

Next, the group withdrawal request processing unit 355 of the group subordinate terminal 130 transmits, via the communication unit 370, the group withdrawal request (M620) to the group managing terminal 120 whose IP address is held by the group managing terminal IP holding unit 305 (S706), to request that its terminal (the group subordinate terminal 130) withdraw from the group 110.

Then, the communication unit 470 of the group managing terminal 120 receives the group withdrawal request (M620) (S707). Based on the identifier of the received message, the communication unit 470 of the group managing terminal 120 identifies the message as the group withdrawal request (M620) requesting for withdrawal from the group 110, and thus transmits the group withdrawal request (M620) to the group withdrawal request receiving unit 450. Having received the group withdrawal request (M620), the group withdrawal request receiving unit 450 instructs the group withdrawal processing unit 455 to start the processing for withdrawing the group subordinate terminal 130 from the group 110.

Next, the group withdrawal processing unit 455 of the group managing terminal 120 analyzes the received message to recognize the IP address of the source terminal. Here, recognized is the IP address of the group subordinate terminal 130. Next, the group withdrawal processing unit 455 of the group managing terminal 120 deletes the IP address of the group subordinate terminal 130 from the IP addresses held by the group subordinate terminal IP holding unit 410. At this stage, the IP address that remains in the group subordinate terminal IP holding unit 410 is the IP address of the group subordinate terminal 131 only. Thereafter, the group key held by the group key holding unit 420 is updated to a random value. Next, the group withdrawal processing unit 455 of the group managing terminal 120 transmits, via the communication unit 470, the group key update instruction (M630) having the new group key as a parameter, to each terminal whose IP address is held by the group subordinate terminal IP holding unit 410 (S708). Here, the group withdrawal processing unit 455 transmits the group key update instruction (M630) to the group subordinate terminal 131.

Next, the communication unit 370 of the group subordinate terminal 131 receives the group key update instruction (M630) (S709). Based on the identifier of the received message, the communication unit 370 identifies the message received from the group managing terminal 120 as the group key update instruction (M630) instructing the group subordinate terminal 131 to update the group key, and thus transmits the group key update instruction (M630) to the group key update processing unit 390.

Next, the group key update processing unit 390 of the group subordinate terminal 131 rewrites the value of the group key held by the group key holding unit 310 to the value specified in the parameter. After updating the group key, the group key update processing unit 390 transmits, via the communication unit 370, the group key update completion notification (M640) to the group managing terminal 120 which has transmitted the group key update instruction (M630) (S710).

Next, the communication unit 470 of the group managing terminal 120 receives the group key update completion notification (M640) (S711). Based on the identifier of the received message, the communication unit 470 identifies the message as the group key update completion notification (M640) indicating that the update of the group key is completed, and thus transmits the group key update completion notification (M640) to the update processing unit 460.

Next, the update processing unit 460 of the group managing terminal 120 transmits the group withdrawal completion notification (M650) to the group subordinate terminal 130 which has transmitted the group withdrawal request (M620) in Step S706 (S712). The parameter of the group withdrawal completion notification (M650) is the group withdrawal certificate. It should be noted that the group withdrawal certificate includes, as described above, the following three fields.

Field A: The IP address of the group subordinate terminal 130 which has transmitted the message of the group withdrawal request (M620).

Field B: The IP address of the group managing terminal 120.

Field C: A value obtained by calculating hash values of the field A and the field B and encrypting the calculated values using the apparatus-unique key of the group managing terminal 120.

Next, the communication unit 370 of the group subordinate terminal 130 receives the group withdrawal completion notification (M650) (S713). Based on the identifier of the received message, the communication unit 370 identifies the message as the group withdrawal completion notification (M650) indicating that the withdrawal of the group subordinate terminal 130 from the group 110 is completed, and thus transmits the group withdrawal completion notification (M650) to the group withdrawal completion processing unit 360.

Next, the group withdrawal completion processing unit 360 of the group subordinate terminal 130 transmits the apparatus-unique key update request (M660) to the updating server 160 (S714). The parameter of this message is the group withdrawal certificate, that is, the parameter of the group withdrawal completion notification (M650) received.

Next, the communication unit 570 of the updating server 160 receives the apparatus-unique key update request (M660) (S715). Based on the identifier of the received message, the communication unit 570 identifies the message as the apparatus-unique key update request (M660) requesting for a new apparatus-unique key, and thus transmits the apparatus-unique key update request (M660) to the update processing verifying unit 540.

Next, the update processing verifying unit 540 of the updating server 160 verifies the group withdrawal certificate, that is, the parameter of the apparatus-unique key update request (M660). After the verification, the update processing verifying unit 540 transmits the apparatus-unique key update notification (M670) to the group subordinate terminal 130 which has transmitted the apparatus-unique key update request (M660). The processing from the verification up to the apparatus-unique key update notification is the same as the processing shown in FIG. 6.

Next, the communication unit 370 of the group subordinate terminal 130 receives the apparatus-unique key update notification (M670) (S717). Based on the identifier of the received message, the communication unit 370 identifies the message as the apparatus-unique key update notification (M670), and thus transmits the apparatus-unique key update notification (M670) to the update processing unit 375.

The update processing unit 375 of the group subordinate terminal 130 overwrites the apparatus-unique key held by the apparatus-unique key holding unit 330 with the value of the new apparatus-unique key received as the parameter of the apparatus-unique key update notification (M670). Furthermore, the update processing unit 375 of the group subordinate terminal 130 overwrites the group key processing module held by the group key processing module holding unit 325 with the update-version group key processing module received as the parameter of the apparatus-unique key update notification (M670) (S718). In this manner, the apparatus-unique key is updated in the group key updating system 100.

As described above, the apparatus-unique key held by the group subordinate terminal 130 is invalidated by updating, in Step S702, the apparatus-unique key of the group subordinate terminal 130 held by the apparatus-unique key managing server 150. That is to say, the content distributing server 170 no longer encrypts content with the apparatus-unique key held by the group subordinate terminal 130. Consequently, the group subordinate terminal 130 can no longer use new content until the update of the apparatus-unique key and the group key processing module is completed in Step S718. Thus, it is possible to encourage the user who wishes to use new content, to update the apparatus-unique key and the group key processing module.

Further, through Steps S707 to S711, the group keys of the group managing terminal 120 and the group subordinate terminal 131 are updated to have a value different from that of the group key held by the group subordinate terminal 130. Therefore, even when the group key processing module of the group subordinate terminal 130 having the vulnerable group key processing module is analyzed and thus the group key is analyzed without authorization, the group key analyzed without authorization is no longer used from Step S711 onwards, and the updated group key is used instead. In other words, the group key analyzed without authorization is no longer used after the group subordinate terminal 130 is updated. As a result, the updating server 160 becomes able to update the group key of the group 110 to which the group subordinate terminal 130 had belonged, without the information on which terminals belong to the same group as the group subordinate terminal 130 belongs.

In addition, when the group subordinate terminal 130 do not update the apparatus-unique key despite of the update instruction received from the updating server 160 in S704, the group subordinate terminal 130 is no longer able to use new content from S704 onwards. This makes it possible to encourage the update of the group key.

Furthermore, the group subordinate terminal 130 transmits the group withdrawal request (M620) through the group withdrawal request processing unit 355. As a result, the group key held by the group key holding unit 310 is invalidated by the group managing terminal 120.

Furthermore, after the control on the group key invalidation is performed, the update processing unit 375 of the group subordinate terminal 130 obtains the new apparatus-unique key and the new group key processing module by receiving, via the communication unit 370, the apparatus-unique key update notification (M670) transmitted by the updating server 160. This prevents the update-version apparatus-unique key from being received without the update of the group key, and thus makes it possible to encourage the update of the group key.

Further, as shown in Steps 712 to S714, the group withdrawal completion processing unit 360 of the group subordinate terminal 130 receives the group withdrawal completion notification (M650) containing the group withdrawal certificate that indicates the completion of the group key invalidation, that is, the completion of the withdrawal from the group 110. After that, the update processing unit 375 transmits to the updating server 160 the apparatus-unique key update request (M660) containing the group withdrawal certificate. In this manner, it is possible to more reliably encourage the update of the group key, since the apparatus-unique key is updated after the invalidation of the group key is completed.

In addition, it is possible to facilitate the determination of the timing at which the updating server 160 transmits the apparatus-unique key update notification (M670), since the group withdrawal completion processing unit 360 of the group subordinate terminal 130 transmits the apparatus-unique key update request (M660) to the updating server 160.

As described above, it is possible to provide a group subordinate terminal, a group managing terminal, a server, a key updating system, and a key updating method therefor for enabling the update of the group key of the terminal apparatuses making up the group, except for the terminal apparatus having an apparatus-unique key to be updated, without the need for the updating service provider to have the list of the terminal apparatuses making up the group including the terminal apparatus to be updated.

<First Variation>

It is to be noted that although the above described embodiment has illustrated the configuration in which the group subordinate terminal 130 transmits the apparatus-unique key update request (M660) to the updating server 160, the group managing terminal 120 may transmit the apparatus-unique key update request (M660) instead. For example, instead of transmitting the group withdrawal completion notification (M650) to the group subordinate terminal 130, the group managing terminal 120 transmits the apparatus-unique key update request (M660) to the updating server 160. Here, it is assumed that the IP address of the group subordinate terminal 130, which is the source terminal of the group withdrawal request (M620), is specified as the IP address of the source terminal of the apparatus-unique key update request (M660).

<Second Variation>

Furthermore, although the above described embodiment has illustrated the configuration in which the group managing terminal 120 transmits the group withdrawal completion notification (M650) after receiving the group key update completion notification (M640), the group managing terminal 120 may transmit the group withdrawal completion notification (M650) after transmitting the group key update instruction (M630) without receiving the group key update completion notification (M640).

<Third Variation>

In addition, although the above described embodiment has illustrated the case of employing symmetric-key cryptography where the apparatus-unique key held by each terminal and the apparatus-unique key held by the apparatus-unique key managing server 150 are common keys, the configuration may instead be that: the encryption and decryption processing unit 340 or 440 held by each terminal performs public-key cryptographic processing; each terminal holds a secret key as its apparatus-unique key; and the apparatus-unique key managing server 150 holds a public key.

With such a configuration, the apparatus-unique key held by the apparatus-unique key managing server 150 is a public key, which makes it possible to prevent leakage of confidential information from the apparatus-unique key managing server 150.

<Fourth Variation>

Moreover, although the above described embodiment has shown, for the purpose of simplifying the description, the configuration in which the new apparatus-unique key and the update-version module are transmitted in plain text through the apparatus-unique key update notification (M670), the new apparatus-unique key and the update-version module may be transmitted in such a way that they are encrypted using the pre-updated old key held by the group subordinate terminal 130. In such a configuration, the apparatus-unique key managing server 150 holds both the pre-updated old key and the updated new key.

Furthermore, the messages exchanged between the terminals may by encrypted and decrypted using the group key. In addition, the messages may include a signature associated with the apparatus-unique key.

Such a configuration makes it difficult to forge the apparatus-unique key update request (M660).

<Fifth Variation>

Furthermore, the key used by the group subordinate terminal 130 and the updating server 160 in transmitting and receiving the apparatus-unique key update request (M660) may be separately held in advance by the group subordinate terminal 130 and the updating server 160. Such a configuration makes it difficult to forge the apparatus-unique key update request (M660). In such a case, the group withdrawal certificate may not be generated.

<Sixth Variation>

Moreover, in the above described embodiment, the content distributing server 170 transmits content after encrypting the entire content using the apparatus-unique key of the destination terminal, and when the content is to be shared by group terminals (the group managing terminal and group subordinate terminals), one of the group terminals once decrypts the entire content using the apparatus-unique key and re-encrypts the decrypted content using the group key, and transmits the re-encrypted content to other group terminals. However, the load on the content distributing server 170 for calculation is great when there is a large number of destination terminals to distribute content to. Further, the load on the terminals on the transmission side for calculation is also great when the content is to be shared among the group 110.

Therefore, the configuration may be that: the content is encrypted in advance using a title key different from the apparatus-unique key, and when the content distributing server 170 is to transmit the content, only the title key is encrypted using the apparatus-unique key of the destination terminal, and the content encrypted using the title key and the title key encrypted using the apparatus-unique key of the destination terminal are transmitted. In doing so, the receiving side uses the content by decrypting the title key using the apparatus-unique key held by the terminal, and then by decrypting the content using the decrypted title key.

Further, when the content is to be shared, one of the group terminals on the transmission side (the group managing terminal and the group subordinate terminals) performs the following: once decrypts the title key using its apparatus-unique key; re-encrypts the decrypted title key using the group key; and transmits the title key encrypted using the group key and the content encrypted using the re-encrypted title key. The group terminals on the reception side (the group managing terminal and the group subordinate terminals) use the content by decrypting the title key re-encrypted using the group key held by the group terminals, followed by decrypting the content using the decrypted title key.

Such a configuration enables reduction of the calculation load on the content distributing server 170, and further enables reduction of the calculation load on one of the group terminals on the transmission side (the group managing terminal and the group subordinate terminals) when the content is to be shared. Furthermore, the content distributing server 170 may multicast the content encrypted using the title key, and unicast only the title key encrypted using the apparatus-unique key of the destination terminal.

In addition, the updating server 160, described in the fourth and fifth variations, which transmits the update-version module after encrypting it, may in the same manner transmit the update-version module after encrypting it using the title key, and transmit the title key after encrypting only the title key using the apparatus-unique key and the like of the destination terminal. Furthermore, in doing so, the update-version module encrypted using the title key may be multicasted in advance.

<Seventh Variation>

Also, although the above described embodiment has illustrated the configuration in which the update processing unit 520 of the updating server 160 sets a new apparatus-unique key of the group subordinate terminal 130 in the apparatus-unique key managing server 150, the configuration may be that: the update processing unit 520 of the updating server 160 transmits an instruction to invalidate the old key; and the update processing verifying unit 540 generates a new apparatus-unique key and transmits the apparatus-unique key update instruction (M605). Such a configuration eliminates unnecessary generation of a new key for the group subordinate terminal which is not to be updated.

<Eighth Variation>

Furthermore, in the above described embodiment, the update instruction (M610) is the trigger for the group subordinate terminal 130 to withdraw from its group. Therefore, when the group subordinate terminal 130 withdraws from the group 110 before receiving the update instruction (M610), the group withdrawal certificate is not issued. In view of the above, the configuration may be that the group subordinate terminal 130 includes a group withdrawal certificate holding unit. In such a configuration, the group subordinate terminal 130 is assumed to store the obtained group withdrawal certificate in the group withdrawal certificate holding unit when withdrawing from the group 110, and when the group withdrawal certificate holding unit holds a group withdrawal certificate, the group withdrawal completion processing unit 360 transmits to the updating server 160 the apparatus-unique key update request (M660) containing the group withdrawal certificate as the parameter.

With such a configuration, even when the group subordinate terminal 130 withdraws from its group at a timing irrelevant to the reception of the update instruction (M610), it is possible for the group subordinate terminal 130 to update the apparatus-unique key and the group key processing module followed by the withdrawal. It should be noted that the group withdrawal certificate is deleted when the group subordinate terminal 130 joins another group.

<Ninth Variation>

Also, although the above described embodiment has illustrated that IP addresses are used as information to identify the destination of the communication in a communication network, other identification information may be used such as Media Access Control (MAC) addresses, email addresses, and Uniform Resource Locators (URL).

<Tenth Variation>

In addition, although the above described embodiment has illustrated that the group subordinate terminal 130 having vulnerability updates the vulnerable module by receiving the update-version module, there may be cases where the size and the processing time of the update-version module that overcomes the vulnerability increase to the extent that the group subordinate terminal 130 cannot use the update-version module. In such cases, only the new apparatus-unique key may be transmitted as the parameter of the apparatus-unique key update notification (M670).

In such a configuration, the group subordinate terminal 130 having vulnerability judges whether or not the parameter of the apparatus-unique key update notification (M670) includes the update-version module. When the update-version module is not included, the group subordinate terminal 130 invalidates the group key processing by, for example, clearing the memory of the group key processing module holding unit 325.

It should be noted that such a configuration makes the group subordinate terminal 130 unable to share content with the group 110, and thus it is desirable, in the case where external hardware having the group key processing unit 320 is added, that the group key processing can be performed using the external hardware. In such a case, the group key processing unit 320 judges whether or not the external hardware is present, and in the case where it is present, starts the group key processing of the external hardware.

<Eleventh Variation>

Furthermore, although the above described embodiment has illustrated that the update instruction (M610) transmitted from the updating server 160 to the group subordinate terminal 130 is the trigger for the group subordinate terminal 130 to start the processing for withdrawing from its group, the withdrawal from the group may be performed through other triggers. For example, once the apparatus-unique key of the group subordinate terminal 130 is invalidated through the apparatus-unique key update instruction (M605), the group subordinate terminal 130 can no longer decrypt the content received from the content distributing server 170. Therefore, a judgment may be made on whether or not the content received from the content distributing server 170 has been decrypted, and when it is judged that the content has not been decrypted, this judgment result may be used as the trigger for the withdrawal from the group. Here, the judgment on whether or not the content has been decrypted may be made by: providing a rule which requires, for example, a specific value to be added to the end of content in plain text; and judging, when the content is decrypted, whether or not the value at the end of the decrypted cipher text is the specific value.

<Twelfth Variation>

Also, the above described embodiment has illustrated that the updating server 160: generates a new apparatus-unique key for the group subordinate terminal 130 which is the update target terminal; and updates, through the apparatus-unique key update instruction (M605), the apparatus-unique key of the group subordinate terminal 130 held by the apparatus-unique key managing server 150. However, the operator on the updating service provider side may directly update the apparatus-unique key of the group subordinate terminal 130 held by the apparatus-unique key managing server 150.

<Thirteenth Variation>

Furthermore, the above described embodiment has illustrated that when the encryption and decryption is performed using the group key, the group subordinate terminal 130 uses the module held by the group key processing module holding unit 325, and when the decryption is performed using the apparatus-unique key, the encryption and decryption processing unit 340 performs the decryption without using the module held by the group key processing module holding unit 325. However, in the case where the encryption and decryption processing using the group key and the encryption and decryption processing using the apparatus-unique key share the same cryptographic algorithm, a common cryptographic processing module may be provided. That is to say, the configuration may be that when the encryption and decryption is to be performed using the group key, a common cryptographic processing module is executed using the group key held by the group key holding unit 310 as the key, and when the encryption and decryption is to be performed using the apparatus-unique key, the common cryptographic processing module is executed using the apparatus-unique key held by the apparatus-unique key holding unit 330 as the key. With such a configuration, an update of just one module enables the update of both: the cryptographic processing module that performs the encryption and decryption processing using the group key; and the cryptographic processing module that performs the encryption and decryption processing using the apparatus-unique key.

<Fourteenth Variation>

Further, in the above described embodiment, the group subordinate terminal 130 transmits the apparatus-unique key update request (M660) to the updating server 160, and receives an update-version module and a new apparatus-unique key from the updating server 160. However, the group subordinate terminal 130 may transmit the apparatus-unique key update request (M660) to the updating server 160 and to the apparatus-unique key managing server 150, and receive an update-version module from the updating server 160 and a new apparatus-unique key from the apparatus-unique key managing server 150.

Such a configuration enables the update of the apparatus-unique key without the need for the apparatus-unique key managing server 150 to notify the updating server 160 of the group subordinate terminal 130's apparatus-unique key.

<Fifteenth Variation>

Moreover, although the above described embodiment has omitted a detailed description of the operation performed after the group subordinate terminal 130 updates the group key processing module and the apparatus-unique key, the operation may be as follows.

The group subordinate terminal 130 transmits a message (a group join request) to the group managing terminal 120 to request a rejoin to the group 110, after updating the group key processing module and the apparatus-unique key. Having received the message of the group join request, the group managing terminal 120 transmits to the group subordinate terminal 130 the updated group key stored in the group key holding unit 420. Also, the group managing terminal 120 adds the IP address of the group subordinate terminal 130 to the IP address list held by the group subordinate terminal IP holding unit 410. The group subordinate terminal 130 updates the group key by storing the received group key in the group key holding unit 310.

<Sixteenth Variation>

In addition, although the above described embodiment has omitted a description of the operation performed by the group managing terminal 120 and the group subordinate terminal 130 or 131 for using the encrypted content after the group key and the apparatus-unique key are updated, the operation may be as follows.

For example, the group managing terminal 120 transmits to the group subordinate terminal 131 the group key update instruction (M630) containing the new group key. Having received this, in the case where the encrypted content held in the group subordinate terminal 131 is content encrypted using the pre-updated key, the group subordinate terminal 131 once decrypts this encrypted content using the pre-updated group key, and then encrypts the decrypted content using a new group key thereafter. This is for the purpose of preventing a situation where the content encrypted using the pre-updated group key cannot be decrypted using the updated group key because the pre-updated group key is different from the updated group key. Likewise, having received the apparatus-unique key update notification (M670), in the case where the encrypted content held in the group subordinate terminal 130 is content encrypted using the pre-updated key, the group subordinate terminal 130 once decrypts the content using the pre-updated apparatus-unique key, and then encrypts the decrypted content using a new apparatus-unique key thereafter. This is for the purpose of preventing a situation where the content encrypted using the pre-updated apparatus-unique key cannot be decrypted using the updated apparatus-unique key because the pre-updated apparatus-unique key is different from the updated apparatus-unique key.

<Seventeenth Variation>

Furthermore, the above described embodiment has illustrated the configuration that the updating server 160 transmits the update instruction (M610) to the group subordinate terminal 130 targeted for an update. However, there may be cases where the group subordinate terminal 130 cannot receive the update instruction (M610) or avoids receiving it. Thus, the configuration may be as follows.

The updating server 160 multicasts the update instruction (M610) containing, as an parameter, the IP address of the group subordinate terminal 130 which is the update target terminal. The group managing terminal 120 checks whether or not the multicasted IP address of the update target terminal is stored in the group subordinate terminal IP holding unit 410 of the group managing terminal 120. When it is checked that the IP address is stored, the group managing terminal 120 performs the same processing as in the case of receiving the group withdrawal request (M620) from the terminal having this IP address. Such a configuration enables the update of the group key even when the group subordinate terminal 130 cannot receive the update instruction (M610) or avoids receiving it.

<Eighteenth Variation>

Furthermore, the above described embodiment has illustrated the case where the group withdrawal certificate includes the following three fields.

Field A: The IP address of the source terminal of the group withdrawal request (M620).

Field B: The IP address of the group managing terminal 120.

Field C: A value obtained by calculating hash values of the field A and the field B and encrypting the calculated values using the apparatus-unique key of the group managing terminal 120.

However, the group withdrawal certificate may be configured with the following.

Field D: A value obtained by encrypting the IP address of the source terminal of the group withdrawal request (M620) using the apparatus-unique key of the group managing terminal 120.

Field E: The IP address of the group managing terminal 120.

In such a case, the updating server 160 verifies the group withdrawal certificate through the following steps.

In Step 1, the apparatus-unique key of the terminal having the IP address indicated in the field E is obtained from the apparatus-unique key managing server 150.

In Step 2, the field D is decrypted using the obtained apparatus-unique key.

In Step 3, it is judged whether or not the decrypted IP address is stored in the update target terminal IP holding unit 510 of the updating server 160. In the case of judging that the decrypted IP address is stored, the apparatus-unique key update notification (M660) is transmitted; otherwise, the notification processing is not performed.

Such a configuration results in an increases in the processing time required for the encryption performed by the group managing terminal 120 when generating the group withdrawal certificate, but it results in reduction in the processing time required for the hash calculation performed by the group managing terminal 120. In addition, the group withdrawal certificate decreases in size by the field C.

(Other Variations)

It is to be noted that although the present invention has been described based on the above embodiments, it is obviously not limited to such embodiments. The following cases are also to be included in the present invention.

(1) Each device described above is specifically a computer system configured with a microprocessor, a ROM, a random access memory (RAM), a hard disk unit, a display unit, a keyboard, a mouse, and so on. The RAM or the hard disk unit has a computer program stored therein. Each device achieves its function through the microprocessor operating in accordance with the computer program. Here, the computer program is a combination of plural instruction codes each indicating an instruction to the computer for achieving a predetermined function.

(2) One of or all of the constituent elements of each device described above may be configured with a single system Large Scale Integration (LSI). The system LSI is a super multifunctional LSI having plural components integrated on a single chip, and is specifically a computer system configured with a microprocessor, a ROM, a RAM, and so on. The RAM has a computer program stored therein. The system LSI achieves its function through the microprocessor operating in accordance with the computer program.

(3) One of or all of the constituent elements of each device described above may be configured with an IC card detachable from each device, or a single module. The IC card or the module is a computer system configured with a microprocessor, a ROM, a RAM, and so on. The IC card or the module may include the above mentioned super multifunctional LSI. The IC card or the module achieves its function through the microprocessor operating in accordance with the computer program. The IC card or the module may be tamper resistant.

(4) The present invention may be regarded as the methods described above. Furthermore, the present invention may also be regarded as a computer program causing a computer to implement such methods, or as digital signal processing configured with the computer program.

Moreover, the present invention may be regarded as a computer-readable recording medium on which the computer program or the digital signal is recorded, such as a flexible disk, a hard disk, a CD-ROM, a magneto-optical (MO) disk, a digital versatile disc (DVD), a DVD-ROM, DVD-RAM, a Blu-ray Disc (BD), and a semiconductor memory. Further, the present invention may also be regarded as the digital signal recorded on these recoding media.

In addition, the present invention may be transmitted in the form of the computer program or the digital signal via an electronic communication line, a wireless or wired communication line, a network typified by the Internet, a data broadcast, and so on.

Furthermore, the present invention may be regarded as a computer system configured with a microprocessor and a memory where the computer program is stored in the memory, and the microprocessor operates in accordance with the computer program.

Moreover, the present invention may be implemented by another independent computer system by transmitting the program or the digital signal recorded on a recording medium, or by transmitting the program or the digital signal via a network and the like.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is applicable to terminal apparatuses, key updating servers, key updating systems, and key updating methods, and is especially applicable to: terminal apparatuses included in terminals and the like that receive content distributing services such as a digital broadcast, a cable television service (CATV), the Internet and so on; key updating servers which update keys of the terminal apparatuses; group key updating systems; and group key updating methods.

What is claimed is:

1. A group subordinate terminal in a key updating system that includes a server and a group of terminals including: a group managing terminal;

and group subordinate terminals including said group subordinate terminal, said group subordinate terminal comprising: an apparatus-unique key holding unit configured to hold an apparatus-unique key that is a key corresponding to said group subordinate terminal only; a group key holding unit configured to hold a group key that is also held by the group managing terminal and the rest of the group subordinate terminals; an encryption and decryption processing unit configured to encrypt and decrypt data using either the apparatus-unique key or the group key; a group withdrawal request processing unit configured to transmit a group withdrawal request to the group managing terminal in response to an instruction to update the apparatus-unique key, the group withdrawal request requesting withdrawal of said group subordinate terminal from the group of terminals: an update apparatus-unique key requesting unit configured to request another apparatus-unique key by: receiving a group withdrawal certificate from the group managing terminal; and then transmitting the received group withdrawal certificate to the server, the group withdrawal certificate indicating that the withdrawal of said group subordinate terminal from the group of terminals is completed through invalidation of the group key; and an update processing unit configured to obtain the other apparatus-unique key from the server, and to rewrite the apparatus-unique key held by said apparatus-unique key holding unit to the obtained other apparatus-unique key, wherein said update processing unit is not allowed to obtain the other apparatus-unique key from the server until said update apparatus-unique key requesting unit transmits the received group withdrawal certificate to the server.

2. The group subordinate terminal according to claim 1, wherein said update processing unit includes a group key update processing unit configured to request the group managing terminal for another group key that is valid, and to update the group key held by said group key holding unit to the other group key that is valid, the other group key being obtained from the group managing terminal.

3. The group subordinate terminal according to claim 2 further comprising
an update instruction receiving unit configured to instruct said group withdrawal request processing unit to update the apparatus-unique key in response to an instruction from the server to update the apparatus-unique key.

4. The group subordinate terminal according to claim 2 further comprising
an update instruction receiving unit configured to instruct said group withdrawal request processing unit to update the apparatus-unique key in response to an instruction from a user of said group subordinate terminal to update the apparatus-unique key.

5. The group subordinate terminal according to claim 3, wherein said update apparatus-unique key requesting unit includes a group withdrawal certificate holding unit configured to hold the group withdrawal certificate.

6. A group managing terminal in a key updating system that includes a server and a group of terminals including: said group managing terminal; a first group subordinate terminal and a second group subordinate terminal, said group subordinate terminal comprising:
a group key holding unit configured to hold a group key that is also held by the first group subordinate terminal and the second group subordinate terminal;
a group withdrawal request receiving unit configured to receive a group withdrawal request from the first group subordinate terminal, the group withdrawal request requesting withdrawal of the first group subordinate terminal from the group of terminals including the first group subordinate terminal;
a group withdrawal processing unit configured to generate a new group key and transmit the generated new group key to the second group subordinate terminal, in response to the group withdrawal request; and
a group withdrawal certificate transmitting unit configured to receive a group key update completion notification from the second group subordinate terminal, and to transmit a group withdrawal certificate to the first group subordinate terminal, wherein (i) the group key update completion notification indicates that update of the group key held by the second group subordinate terminal to the new group key is completed, (ii) the group withdrawal certificate indicates that the withdrawal of the first group subordinate terminal from the group of terminals including the first group subordinate terminal is completed through invalidation of the group key held by the first group subordinate terminal, and (iii) the transmission of the group withdrawal certificate from the first group subordinate terminal to the server allows the first group subordinate terminal to receive a new apparatus-unique key corresponding to the first group subordinate terminal from the server.

7. A server in a key updating system that includes said server and a group of terminals including: a group managing terminal; and group subordinate terminals, said server comprising:
an update key generating unit configured to generate an apparatus-unique key corresponding to one of the group subordinate terminals after said server receives a group withdrawal certificate from the one of the group subordinate terminals, the group withdrawal certificate indicating that withdrawal of the one of the group subordinate terminals from the group of terminals is completed through invalidation of a group key held by the one of the group subordinate terminals; and
an apparatus-unique key update processing unit configured to: receive the group withdrawal certificate from the one of the group subordinate terminals; verify the received group withdrawal certificate; and then transmit the generated apparatus-unique key to the one of the group subordinate terminals.

8. The server according to claim 7, further comprising
a key update instructing unit configured to transmit, to the one of the group subordinate terminals, an instruction to update the apparatus-unique key.

9. A key updating system comprising a server and a group of terminals including: a group managing terminal; a first group subordinate terminal and a second group subordinate terminal,
wherein said first group subordinate terminal includes:
an apparatus-unique key holding unit configured to hold an apparatus-unique key that is a key corresponding to said first group subordinate terminal only;
a group key holding unit configured to hold a group key that is also held by said group managing terminal and said second group subordinate terminal;
an encryption and decryption processing unit configured to encrypt and decrypt data using either the apparatus-unique key or the group key;
a group withdrawal request processing unit configured to transmit a group withdrawal request to said group managing terminal in response to an instruction to update the apparatus-unique key, the group withdrawal request requesting withdrawal of said first group subordinate terminal from said group of terminals including said first group subordinate terminal;
an update apparatus-unique key requesting unit configured to request another apparatus-unique key by: receiving a group withdrawal certificate from said group managing terminal; and then transmitting the received group withdrawal certificate to said server, wherein (i) the group withdrawal certificate indicates that the withdrawal of said first group subordinate terminal from said group of terminals including said first group subordinate terminal is completed through invalidation of the group key, and (ii) the transmission of the group withdrawal certificate from said first group subordinate terminal to said server allows said first group subordinate terminal to receive the other apparatus-unique key corresponding to said first group subordinate terminal from said server; and an update processing unit configured to obtain the other apparatus-unique key from said server, and to rewrite the apparatus-unique key held by said apparatus-unique key holding unit to the obtained other apparatus-unique key, wherein said group managing terminal includes:
- a group key holding unit configured to hold the group key;
- a group withdrawal request receiving unit configured to receive the group withdrawal request from said first group subordinate terminal, the group withdrawal request requesting for the withdrawal of said first group subordinate terminal from said group of terminals including said first group subordinate terminal;
- a group withdrawal processing unit configured to generate a new group key and transmit the generated new group key to said second group subordinate terminal, in response to the group withdrawal request; and
- a group withdrawal certificate transmitting unit configured to receive a group key update completion notification from said second group subordinate terminal, and to transmit the group withdrawal certificate to said first group subordinate terminal, wherein (i) the group key update completion notification indicates that update of the group key held by said second group subordinate terminal to the new group key is completed, (ii) the group withdrawal certificate indicating that the withdrawal of said first group subordinate terminal from said group of terminals including said first group subordinate terminal is completed through the invalidation of the group key held by said first group subordinate terminal, and (iii) the transmission of the group withdrawal certificate from said first group subordinate terminal to said server allows said first group subordinate terminal to receive the other apparatus-unique key corresponding to said first group subordinate terminal from said server, and wherein said server includes:
- an update key generating unit configured to generate an apparatus-unique key corresponding to said first group subordinate terminal after said server receives the group withdrawal certificate from said first group subordinate terminal; and
- an apparatus-unique key update processing unit configured to: receive the group withdrawal certificate from said first group subordinate terminal; verify the received group withdrawal certificate; and then transmit the generated apparatus-unique key to said first group subordinate terminal as the other apparatus-unique key.

10. A method for updating a key of a group subordinate terminal in a key updating system that includes a server and a group of terminals including: a group managing terminal; and group subordinate terminals including the group subordinate terminal, said method comprising:
- transmitting a group withdrawal request to the group managing terminal in response to an instruction to update an apparatus-unique key that is a key corresponding to the group subordinate terminal only, the group withdrawal request requesting for withdrawal of the group subordinate terminal from the group of terminals;
- requesting another apparatus-unique key by: receiving a group withdrawal certificate from the group managing terminal; and then transmitting the received group withdrawal certificate to the server, the group withdrawal certificate indicating that the withdrawal of the group subordinate terminal from the group of terminals is completed through invalidation of a group key; and
- obtaining the other apparatus-unique key from the server, and rewriting the apparatus-unique key to the obtained other apparatus-unique key, wherein the other apparatus-unique key cannot be received from the server until the received group withdrawal certificate is transmitted to the server.

11. A method for updating a key of a group managing terminal in a key updating system that includes a server and a group of terminals including: the group managing terminal; a first group subordinate terminal; and a second group subordinate terminal, said method comprising:
- receiving a group withdrawal request from the first group subordinate terminal, the group withdrawal request requesting for withdrawal of the first group subordinate terminal from the group of terminals including the first group subordinate terminal;
- generating a new group key to be held by the group managing terminal, the first group subordinate terminal, and the second group subordinate terminal, and transmitting the generated new group key to the second group subordinate terminal, in response to the group withdrawal request; and
- receiving a group key update completion notification from the second group subordinate terminal, and transmitting a group withdrawal certificate to the first group subordinate terminal, wherein (i) the group key update completion notification indicating that update of the group key held by the second group subordinate terminal to the new group key is completed, (ii) the group withdrawal certificate indicating that the withdrawal of the first group subordinate terminal from the group of terminals including the first group subordinate terminal is completed through invalidation of the group key held by the first group subordinate terminal, and (iii) the transmission of the group withdrawal certificate from the first group subordinate terminal to the server allows the first group subordinate terminal to receive a new apparatus-unique key corresponding to the first group subordinate terminal from the server.

12. A method for updating a key of a server in a key updating system that includes the server and a group of terminals including a group managing terminal and group subordinate terminals, said method comprising:
- generating an apparatus-unique key corresponding to one of the group subordinate terminals after the server receives a group withdrawal certificate from the one of the group subordinate terminals, the group withdrawal certificate indicating that withdrawal of the group subordinate terminal from the group of terminals is completed through invalidation of a group key held by the one of the group subordinate terminals; and
- receiving the group withdrawal certificate from the one of the group subordinate terminals, verifying the received group withdrawal certificate, and then transmitting the generated apparatus-unique key to the one of the group subordinate terminals.

13. A group subordinate terminal in a key updating system that includes a server and a group of terminals including: a group managing terminal; and group subordinate terminals including said group subordinate terminal, said group subordinate terminal comprising: an apparatus-unique key holding unit configured to hold an apparatus-unique key that is a key corresponding to said group subordinate terminal only; a group key holding unit configured to hold a group key that is also held by the group managing terminal and the rest of the group subordinate terminals; an encryption and decryption processing unit configured to encrypt and decrypt data using either the apparatus-unique key or the group key; a group withdrawal request processing unit configured to transmit a group withdrawal request to the group managing terminal in response to an instruction to update the apparatus-unique key, the group withdrawal request requesting withdrawal of said group subordinate terminal from the group of terminals; an update apparatus-unique key requesting unit configured to request another apparatus-unique key by: receiving a group withdrawal certificate from the group managing terminal; and then transmitting the received group withdrawal certificate to the server, the group withdrawal certificate indicating that the withdrawal of said group subordinate terminal from the group of terminals is completed through invalidation of the group key; and an update processing unit configured to rewrite the apparatus-unique key held by said apparatus-unique key holding unit to the other apparatus-unique key obtained from the server, the other apparatus-unique key being obtained from the server when said update apparatus-unique key requesting unit transmits the received group withdrawal certificate to the server, wherein said update processing unit is not allowed to obtain the other apparatus-unique key from the server until said update apparatus-unique key requesting unit transmits the received group withdrawal certificate to the server.

* * * * *